US012786704B2

(12) United States Patent
Sasi et al.

(10) Patent No.: US 12,786,704 B2
(45) Date of Patent: Nov. 3, 2026

(54) APPARATUS AND METHOD OF GENERATING APPLICATION SPECIFIC KEYS USING KEY DERIVED FROM NETWORK ACCESS AUTHENTICATION

(71) Applicant: Samsung Electronics Co., Ltd., Suwon-si (KR)

(72) Inventors: Nivedya Parambath Sasi, Bangalore (IN); Rajavelsamy Rajadurai, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 17/904,456

(22) PCT Filed: Feb. 19, 2021

(86) PCT No.: PCT/KR2021/002124
§ 371 (c)(1),
(2) Date: Aug. 17, 2022

(87) PCT Pub. No.: WO2021/167399
PCT Pub. Date: Aug. 26, 2021

(65) Prior Publication Data

US 2023/0068196 A1 Mar. 2, 2023

(30) Foreign Application Priority Data

Feb. 19, 2020 (IN) ............................. 202041007160
Feb. 17, 2021 (IN) ............................. 202041007160

(51) Int. Cl.
*H04W 12/06* (2021.01)
*H04W 12/041* (2021.01)
*H04W 12/0433* (2021.01)

(52) U.S. Cl.
CPC ......... *H04W 12/06* (2013.01); *H04W 12/041* (2021.01); *H04W 12/0433* (2021.01)

(58) Field of Classification Search
CPC ............. H04W 12/06; H04W 12/0433; H04W 12/041
See application file for complete search history.

(56) References Cited

U.S. PATENT DOCUMENTS 8,813,171 B2 8/2014 Holtmanns et al.
9,369,873 B2 6/2016 Nakarmi et al.
(Continued)

FOREIGN PATENT DOCUMENTS

CN 1801697 A 7/2006
CN 101218800 A 7/2008
(Continued)

OTHER PUBLICATIONS

AKMA based on 3GPP credentials in 5GS (Release 16). Specification [online]. 3rd Generation Partnership Project. V16.1.0, Sep. 2020 [retrieved on Dec. 15, 2025]. Retrieved from the internet: <https://portal.3gpp.org/desktopmodules/Specifications/SpecificationDetails.aspx?specificationId=3690> (Year: 2020).*
(Continued)

*Primary Examiner* — Zhe Liu

(57) ABSTRACT

The present invention discloses a system and method of generating application specific keys using key derived from network access authentication.

6 Claims, 11 Drawing Sheets

(56) References Cited

U.S. PATENT DOCUMENTS

| | | | | |
|---|---|---|---|---|
| 11,330,642 | B2 | 5/2022 | Kim et al. | |
| 2008/0215888 | A1 | 9/2008 | Barriga et al. | |
| 2011/0289315 | A1* | 11/2011 | Laitinen | H04L 9/321 380/44 |
| 2013/0074163 | A1* | 3/2013 | Murakami | G06F 21/6218 726/4 |
| 2014/0365777 | A1 | 12/2014 | Cha et al. | |
| 2015/0163669 | A1* | 6/2015 | Holtmanns | H04W 12/04 726/6 |
| 2015/0281958 | A1* | 10/2015 | Simplicio Junior | H04B 1/3816 713/155 |
| 2018/0270654 | A1 | 9/2018 | Rajadurai et al. | |
| 2019/0223063 | A1 | 7/2019 | Palanigounder et al. | |
| 2019/0342851 | A1 | 11/2019 | Shan et al. | |
| 2020/0068391 | A1 | 2/2020 | Liu et al. | |
| 2020/0359218 | A1* | 11/2020 | Lee | H04M 15/55 |
| 2021/0058780 | A1* | 2/2021 | Yu | H04W 12/08 |
| 2021/0120409 | A1 | 4/2021 | Nair et al. | |
| 2021/0153016 | A1* | 5/2021 | Ben Henda | H04W 12/75 |
| 2021/0392495 | A1* | 12/2021 | Tsiatsis | H04W 12/40 |
| 2022/0060896 | A1* | 2/2022 | Wu | H04L 9/0844 |
| 2022/0174063 | A1* | 6/2022 | Wu | H04L 9/0844 |
| 2022/0295272 | A1* | 9/2022 | Peng | H04W 12/0431 |
| 2022/0345888 | A1* | 10/2022 | Yu | H04W 12/08 |
| 2022/0368684 | A1* | 11/2022 | You | H04L 63/062 |
| 2022/0377540 | A1* | 11/2022 | Deng | H04L 9/08 |
| 2022/0417010 | A1* | 12/2022 | De Kievit | H04W 12/04 |
| 2023/0284030 | A1* | 9/2023 | Baskaran | H04W 12/71 455/411 |

FOREIGN PATENT DOCUMENTS

| | | | | |
|---|---|---|---|---|
| CN | 102415116 | A | 4/2012 | |
| CN | 103460738 | A | 12/2013 | |
| CN | 104247485 | A | 12/2014 | |
| CN | 110035054 | A | 7/2019 | |
| CN | 110291803 | A | 9/2019 | |
| WO | 2019098623 | A1 | 5/2019 | |
| WO | 2019193107 | A1 | 10/2019 | |
| WO | 2020007461 | A1 | 1/2020 | |
| WO | WO-2021031053 | A1 * | 2/2021 | H04L 63/06 |

OTHER PUBLICATIONS

AKMA based on 3GPP credentials in the 5G System (Release 16), Specification [online], 3rd Generation Partnership Project, V0.2.0, Nov. 2019 [retrieved on May 2, 2026], retrieved from the internet: <https://portal.3gpp.org/desktopmodules/ Specifications/ SpecificationDetails.aspx?specificationId=3690> (Year: 2019).*

International Search Report and Written Opinion of the International Searching Authority dated May 25, 2021, in connection with International Application No. PCT/KR2021/002124, 10 pages.

3GPP TR 33.835 V1.2.0 (Nov. 2019), Technical Report, 3rd Generation Partnership Project; Technical Specification Group Services and System Aspects; Study on authentication and key management for applications based on 3GPP credential in 5G (Release 16), Nov. 2019, 79 pages.

3GPP TS 33.535 V0.2.0 (Nov. 2019), Technical Specification, 3rd Generation Partnership Project; Technical Specification Group Services and System Aspects; Authentication and key management for applications based on BGPP credential in 5G (AKMA) (Release 16), Nov. 2019, 11 pages.

Examination report dated Jan. 16, 2022, in connection with Indian Application No. 202041007160, 5 pages.

Supplementary European Search Report dated Jun. 29, 2023, in connection with European Application No. 21757175.1, 7 pages.

Nokia, et al., "Clause 6.Y—Deriving AF key for a specific Application function," S3-194229, Revision of S3-19xxxx, 3GPP TSG-SA3 Meeting #97, Reno, US, Nov. 18-22, 2019, 2 pages.

The First Office Action dated Jul. 29, 2024, in connection with Chinese Application No. 202180015987.2, 20 pages.

Notification of the Decision to Grant Patent Right for Patent for Invention issued Jan. 9, 2025, in connection with Chinese Patent Application No. 202180015987.2, 7 pages.

KPN, "Update of solution #17—Efficient key derivation for e2e security," S3-191877, 3GPP TSG-SA WG3 Meeting #95Bis, Sapporo (Japan), Jun. 24-28, 2019, 12 pages.

Communication pursuant to Article 94(3) EPC dated Mar. 25, 2025, in connection with European Patent Application No. 21757175.1, 5 pages.

Communication under Rule 71(3) EPC, dated Oct. 17, 2025, in connection with European Application No. 21757175.1, 54 pages.

Communication under Rule 71(3) EPC dated Mar. 24, 2026, in connection with European Application No. 21757175.1, 5 pages.

* cited by examiner

APPARATUS AND METHOD OF GENERATING APPLICATION SPECIFIC KEYS USING KEY DERIVED FROM NETWORK ACCESS AUTHENTICATION

CROSS-REFERENCE TO RELATED APPLICATIONS

This application is a 371 National Stage of International Application No. PCT/KR2021/002124, filed Feb. 19, 2021, which claims priority to Indian Patent Application No. 202041007160, filed Feb. 19, 2020, and Indian Patent Application No. 202041007160, filed Feb. 17, 2021, the disclosures of which are herein incorporated by reference in their entirety.

BACKGROUND

1. Field

The present invention relates generally to Authentication and Key Management for Applications (AKMA) service in 3GPP, and more particularly, to a system and method of for generating an Application specific keys for obtaining Authentication and Key Agreement for Applications (AKMA) services to establish a secure interface between a user equipment (UE) and an Application function (AF) in a wireless communication network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

The present invention discloses a system and method of generating an Application specific keys for obtaining Authentication and Key Agreement for Applications (AKMA) services to establish a secure interface between a user equipment (UE) and an Application function (AF) in a wireless communication network.

In the present invention, since the AKMA architecture supports key separation for different AKMA AFs, therefore, an application key (KAAF) derived from KAKMA is introduced for addressing various requirements specified in TS 33.535 v020. In particular, the present invention discloses a method for generating an Application specific keys for obtaining Authentication and Key Agreement for Applications (AKMA) services to establish a secure interface between a user equipment (UE) and an Application function (AF) in a wireless communication network. The method at the network side comprises receiving, by an application function (AF), an application session establishment request message from a UE, wherein the application session establishment request message comprises a UE side authentication token, a UE identifier on the UE side (a key ID), a first application identity parameter of UE (GPSI), a routing identifier (RI), and a freshness parameter (CounterAKMA). The method then identifies, identifying, by the AF, a first network element (AAnF) based on the RI provisioned by the network. Thereafter, the first network element (AAnF) selects a correct corresponding second network element which is an Authentication service function (AUSF) of the requested UE based on the RI provisioned by the network. The AUSF, then obtains a second application identity parameter of the UE (SUPI) from a third network element (UDM: Unified Data Management), wherein the third network element (UDM) provides the second application identity parameter corresponds to the first application identity parameter (GPSI). The selected AUSF then derives a network side agreement key (KAKMA) based on at least one of the first application identity parameter (GPSI), the second application identity parameter (SUPI), RI, RAND and the freshness parameter (CounterAKMA) and a UE identifier (Key ID) for the AKMA services for identification of a subscriber related context of the UE on the network side. The AUSF, then verifies, the UE identifier of the network side (Key ID) is being similar with the received UE identifier of the UE side (key ID). Afterwards, the first network element (AAnF) derives a network side application specific key (KAF) based on at least one of the network side agreement key (KAKMA), an application ID (AF ID), the first application identity parameter (GPSI), the routing ID (RI), and the freshness parameter (CounterAKMA). The first network element (AAnF) provides the derived network side application specific key (KAF) to the Application Function (AF) along with a pre-determined time period and a CounterAF (AF) for authenticating the derived network side application specific key (KAF) at the UE in order to establish a secure interface between the UE and the Application Function (AF).

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
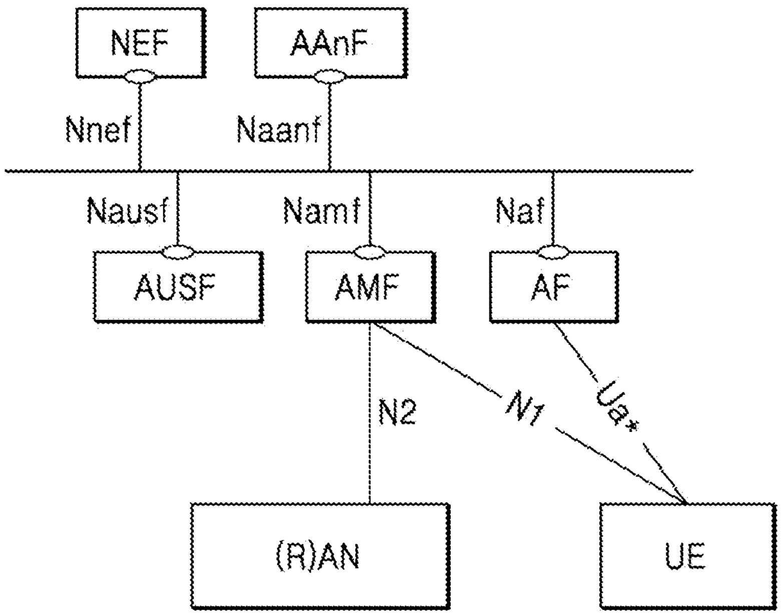
FIG. 1 illustrates Network Model for AKMA.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understand the embodiments of the present invention so as not to obscure the drawings with details that will be readily apparent to those of ordinary skill in the art having benefit of the description herein.

DETAILED DESCRIPTION

According to an embodiment of the disclosure, there is provided a method of generating an Application specific keys for obtaining Authentication and Key Agreement for Applications (AKMA) services in a wireless communication network, the method at a network side comprising: receiving, by an application function (AF), an application session establishment request message from a UE, wherein the application session establishment request message comprises AKMA key ID associated with KAKMA, a first UE identity parameter used as an external identifier (GPSI), a routing identifier (RI), and a freshness parameter (CounterAKMA), identifying, by the AF, a first network element AKMA Anchor Function (AAnF) based on the RI provisioned by a home network, deriving, by a second network element (AUSF), a network side AKMA Key (KAKMA) based on at least one of a network side key (KAUSF), SUPI, GPSI, and RI, and deriving, by the first network element (AAnF), a network side application specific key (KAF) based on at least one of the network side AKMA key (KAKMA), an application ID (AF ID), the first application identity parameter (GPSI), the routing ID (RI), and the freshness parameter (CounterAKMA).

In the embodiment, the method further comprising: providing, by the first network element (AAnF), the derived network side application specific key (KAF) to the Application Function (AF) along with a pre-determined time period and a CounterAF for authenticating the derived network side application specific key (KAF) at the UE.

In the embodiment, the network side agreement key (KAKMA) is derived by the selected AUSF based on at least one of the first application identity parameter (GPSI), the second UE identity parameter (SUPI), RI, RAND and the freshness parameter (CounterAKMA), and AKMA Key ID for the AKMA services for identification of a subscriber related context of the UE on the network side.

In the embodiment, the method further comprising: obtaining, by the AUSF, a second UE identity parameter of the UE (SUPI) from a third network element (UDM), wherein the third network element (UDM) provides the second UE identity parameter corresponds to the first UE (SUPI) identity parameter (GPSI).

In the embodiment, the method further comprising: generating, by the first network element (AAnF), a network side MAC-I based on the KAF derived by the first network element (AAnF), sending, by the first network element (AAnF), the generated network side MAC-I to the AF.

In the embodiment, the UE generates: a UE side agreement key (KAKMA) based on at least one of the first application identity parameter (GPSI), the second application identity parameter (SUPI), the RI, and the freshness parameter (CounterAKMA), the UE identifier of the UE side (Key ID) based on at least one of the first application identity parameter (GPSI), the RI, and the freshness parameter (CounterAKMA), wherein the UE identifier of the UE side (Key ID) is provided to the AF, by the UE, in the application session establishment request message.

In the embodiment, after sending the application session establishment response by the AF to the UE, the UE generates: the UE side application specific key (KAF) based on at least one of the UE side agreement key (KAKMA), the application ID (AF ID), the first application identity parameter (GPSI), the routing ID RI, and the freshness parameter (CounterAKMA).

In the embodiment, the AF sends an application session establishment response to the UE to establish the secure interface between the UE and the Application Function (AF), wherein the UE: derives a UE side MAC-I after the reception of the application session establishment response from the AF, verifies the UE side MAC-I matches with the network side MAC-I, and establishes secure interface between the UE and the Application Function (AF) based on a successful result of the verification.

In the embodiment, the method further comprising performing an authorization check of the UE, by the first network element (AAnF), of the obtained second application identity parameter (SUPI).

In the embodiment, the method further comprising: identifying, by the first network element (AAnF), the third network element (UDM) of the requested UE based on the RI comprised in the application session establishment request message, and obtaining, by the firstnetwork element (AAnF), the second application identity parameter (SUPI) from a third network element (UDM) in a subscription data response message that is received from the UDM, wherein the third network element (UDM) provides the second application identity parameter (SUPI) corresponds to the first application identity parameter (GPSI) to the first network element (AAnF).

In the embodiment, the method further comprising: sending, by the first network element (AAnF) to the AUSF, an AKMA key request comprising the UE side authentication token, the first application identity parameter (GPSI), the second application identity parameter (SUPI), the RI, and the freshness parameter (CounterAKMA) which is the AKMA Key ID.

In the embodiment, a format of the UE or the network side agreement key (KAKMA) is defined by 128 bits of Least Significant Bit (LSB), a format of the UE or the UE identifier (Key ID) is same as CounterAKMA and the UE side authentication token is defined by consecutive 64 bits of Most Significant Bit (MSB) the bit wise format.

In the embodiment, the application function (AF) corresponds to a third party entity, the first network element corresponds to an AKMA Anchor Function (AAnF).

In the embodiment, the application ID (AF ID) identifies which application of the AF is issuing the application session establishment request.

In the embodiment, if the KAF keys are priorly available for the UE in the AAnF, then the AAnF skips requesting the keys (KAF) from the AUSF.

In the embodiment, the method further comprising: sending by the first network element AAnF, the UE identifier, SUPI to the Application Function (Internal) and/or GPSI to the Application Function (External), the UE identifier (SUPI or GPSI) is provided to the Application Function to identify or to authenticate the UE.

In the embodiment, the method further comprising: refreshing by the Application Function, the derived KAF using either CounterKAF, or using the Ua* protocol if it supports.

In the embodiment, UDM provides the GPSI and/or subscription data to the AAnF, corresponding to the SUPI.

According to an embodiment of the disclosure, there is provided a system of generating an Application specific keys for obtaining Authentication and Key Agreement for Applications (AKMA) services in a wireless communication network, the system at a network side comprises a plurality of network nodes having one or more network elements, and an application function (AF), the one or more network elements and the AF coupled with the UE, the plurality of network nodes configured for: receiving, by an application function (AF), an application session establishment request message from a UE, wherein the application session establishment request message comprises AKMA key ID associated with KAKMA, a first UE identity parameter used as an external identifier (GPSI), a routing identifier (RI), and a freshness parameter (CounterAKMA), identifying, by the AF, a first network element AKMA Anchor Function (AAnF) based on the RI provisioned by the home network, deriving, by a second network element (AUSF), a network side AKMA Key (KAKMA) based on at least one of a network side key (KAUSF), SUPI, GPSI, and RI, and deriving, by the first network element (AAnF), a network side application specific key (KAF) based on at least one of the network side AKMA key (KAKMA), an application ID (AF ID), the first application identity parameter (GPSI), the routing ID (RI), and the freshness parameter (CounterAKMA).

In the embodiment, the plurality of network nodes configured for: providing, by the first network element (AAnF), the derived network side application specific key (KAF) to the Application Function (AF) along with a pre-determined time period and a CounterAF for authenticating the derived network side application specific key (KAF) at the UE.

In the embodiment, the network side agreement key (KAKMA) is derived by the selected AUSF based on at least one of the first application identity parameter (GPSI), the second UE identity parameter (SUPI), RI, RAND and the freshness parameter (CounterAKMA), and AKMA Key ID for the AKMA services for identification of a subscriber related context of the UE on the network side.

In the embodiment, the plurality of network nodes configured for: obtaining, by the AUSF, a second UE identity parameter of the UE (SUPI) from a third network element (UDM), wherein the third network element (UDM) provides the second UE identity parameter corresponds to the first UE (SUPI) identity parameter (GPSI).

In the embodiment, the plurality of network nodes configured for: generating, by the first network element (AAnF), a network side MAC-I based on the KAF derived by the first network element (AAnF), sending, by the first network element (AAnF), the generated network side MAC-I to the AF.

In the embodiment, the UE generates: a UE side agreement key (KAKMA) based on at least one of the first application identity parameter (GPSI), the second application identity parameter (SUPI), the RI, and the freshness parameter (CounterAKMA), the UE identifier of the UE side (Key ID) based on at least one of the first application identity parameter (GPSI), the RI, and the freshness parameter (CounterAKMA), wherein the UE identifier of the UE side (Key ID) is provided to the AF, by the UE, in the application session establishment request message.

In the embodiment, after sending the application session establishment response by the AF to the UE, the UE generates: the UE side application specific key (KAF) based on at least one of the UE side agreement key (KAKMA), the application ID (AF ID), the first application identity parameter (GPSI), the routing ID RI, and the freshness parameter (CounterAKMA).

In the embodiment, the AF sends an application session establishment response to the UE to establish the secure interface between the UE and the Application Function (AF), wherein the UE: derives a UE side MAC-I after the reception of the application session establishment response from the AF, verifies the UE side MAC-I matches with the network side MAC-I, and establishes secure interface between the UE and the Application Function (AF) based on a successful result of the verification.

In the embodiment, the plurality of network nodes configured for: performing an authorization check of the UE, by the first network element (AAnF), of the obtained second application identity parameter (SUPI).

In the embodiment, the plurality of network nodes configured for: identifying, by the first network element (AAnF), the third network element (UDM) of the requested UE based on the RI comprised in the application session establishment request message, and obtaining, by the first-network element (AAnF), the second application identity parameter (SUPI) from a third network element (UDM) in a subscription data response message that is received from the UDM, wherein the third network element (UDM) provides the second application identity parameter (SUPI) corresponds to the first application identity parameter (GPSI) to the first network element (AAnF).

In the embodiment, the plurality of network nodes configured for: sending, by the first network element (AAnF) to the AUSF, an AKMA key request comprising the UE side authentication token, the first application identity parameter (GPSI), the second application identity parameter (SUPI), the RI, and the freshness parameter (CounterAKMA) which is the AKMA Key ID.

In the embodiment, a format of the UE or the network side agreement key (KAKMA) is defined by 128 bits of Least Significant Bit (LSB), a format of the UE or the UE identifier (Key ID) is same as CounterAKMA and the UE side authentication token is defined by consecutive 64 bits of Most Significant Bit (MSB) the bit wise format.

In the embodiment, the application function (AF) corresponds to a third party entity, the first network element corresponds to an AKMA Anchor Function (AAnF).

In the embodiment, the application ID (AF ID) identifies which application of the AF is issuing the application session establishment request.

In the embodiment, if the KAF keys are priorly available for the UE in the AAnF, then the AAnF skips requesting the keys (KAF) from the AUSF.

In the embodiment, the plurality of network nodes configured for: sending by the first network element AAnF, the UE identifier, SUPI to the Application Function (Internal) and/or GPSI to the Application Function (External), the UE identifier (SUPI or GPSI) is provided to the Application Function to identify or to authenticate the UE.

In the embodiment, the plurality of network nodes configured for: refreshing, by the Application Function, the derived KAF using either CounterKAF, or using the Ua* protocol if it supports.

In the embodiment, UDM provides the GPSI and/or subscription data to the AAnF, corresponding to the SUPI.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

FIG. 1 illustrates Network Model for AKMA.

3GPP is currently studying Authentication and Key Agreement for Applications (AKMA) service, as shown in FIG. 1, a network service intended to support the authentication and key management based on 3GPP network access credentials in 5G system, for third-party and/or 3GPP applications and services. AKMA is essentially an authentication and key agreement service, where access to an application function/server and establishment of the secure interface between the UE and the application function (AF) is based on the established network access security credentials (established during primary authentication). The application provider (Application Function or Application Server) which uses AKMA, denoted by AF, delegates the authentication of the AF-user to the HPLMN (Home Public Land Mobile Network). Therefore, service provider leverage the security credential provided by the MNO.

As shown in FIG. 1, AAnF (AKMA Anchor Function) is the anchor function in the HPLMN that generates the key material to be used between the UE and the AF and maintains UE AKMA contexts to be used for subsequent bootstrapping requests. AAnF enables the AKMA anchor key (KAKMA) derivation for AKMA service. Before invoking AKMA service, UE shall have successfully registered to the 5G core, which results in KAUSF being stored at the AUSF (AUthentication Server Function) and the UE after a successful 5G primary authentication [TS 33.535 v020].

Throughout this document, the term "Application Function" or "AKMA Application Function" are used interchangeably for the AKMA and Application key derivation procedures. The term "AF ID" indicates the AKMA Application Function ID, which is used as a parameter to identify the requested individual application to the 5GC network from the Application function. The term "Kaaf", "KAAF" and "KAF" is used interchangeably for indicating the Application function key which is derived from KAKMA.

Figure 2:
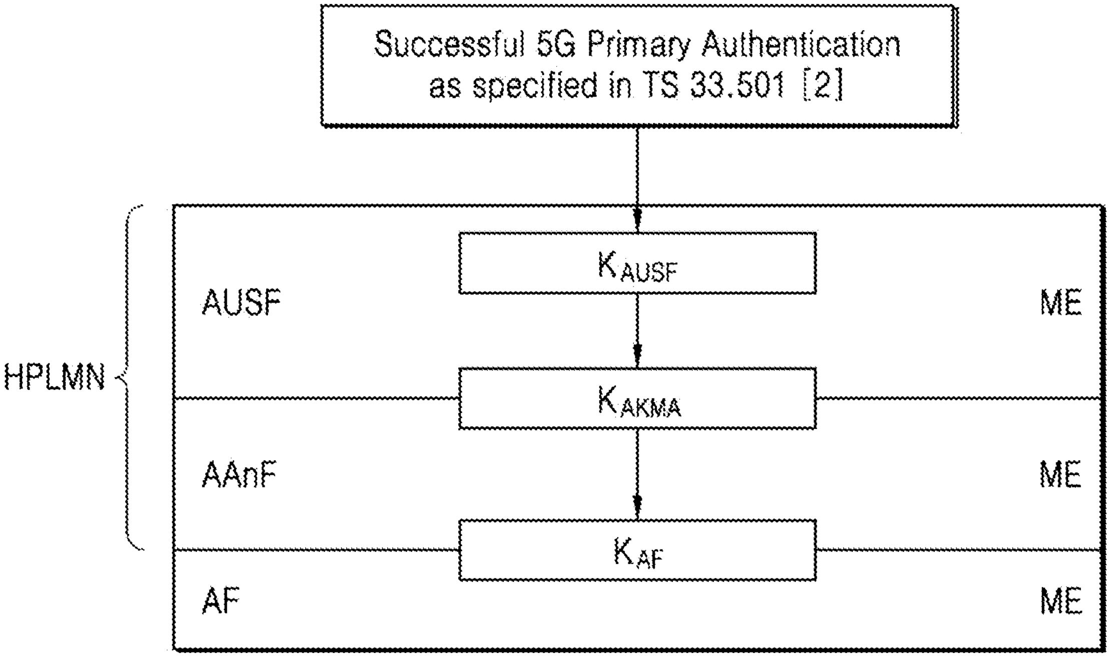
FIG. 2 illustrates AKMA Key Hierarchy.

FIG. 2 illustrates AKMA Key Hierarchy.

The key hierarchy as shown in FIG. 2 includes the following keys: KAUSF, KAKMA, KAF KAUSF is generated by AUSF as specified in TS 33.501.

Keys for AAnF:

$K_{AKMA}$ is a key derived by ME and AUSF from KAUSF.

Keys for AF:

$K_{AF}$ is a key derived by ME and AAnF from KAKMA.

AKMA key hierarchy describes a method for deriving a key KAKMA at the UE and the AUSF. The AUSF sends KAKMA to the anchor function. KAKMA is equivalent to key Ks for GBA in TS 33.220. Both the AAnF and the UE shall use the KAKMA to derive application specific keys needed for AKMA Application Functions (AFs).

The anchor key KAKMA shall use the implicit lifetime and the application key KAF shall use explicit lifetimes based on operator's policy as specified in [TS 33.535 v020]. The application key shall be provided with a maximum lifetime. When the application key lifetime is expired, it shall be re-negotiated. Once the application key is derived from the anchor key, it is necessary for the anchor function to notify the application function about the validity of the derived application key.

Therefore, following are the issues need to be resolved to derive a unique independent keys per UE and per AF, when using the key derived for network access authentication (primary authentication):

- Identification of the key KAKMA of a UE by the network using the UE's application identity (for example, Generic Public Subscription Identifier (GPSI), or Subscription Permanent Identifier (SUPI));
- Identification of the appropriate AUSF by the AKMA function to obtain Key generation service;
- Identification of the AAnF using the Routing Identifier provisioned by the network
- Generation of unique independent KAKMA and KAF keys;
- Mechanism to derive the randomised Key ID;
- Generation of Authentication token for verification of the UE's authenticity; and
- Key Lifetime and revocation of the derived AKMA and Application key.

Thus, there is a need for a solution that overcomes the above-mentioned deficiencies.

Figure 3A:
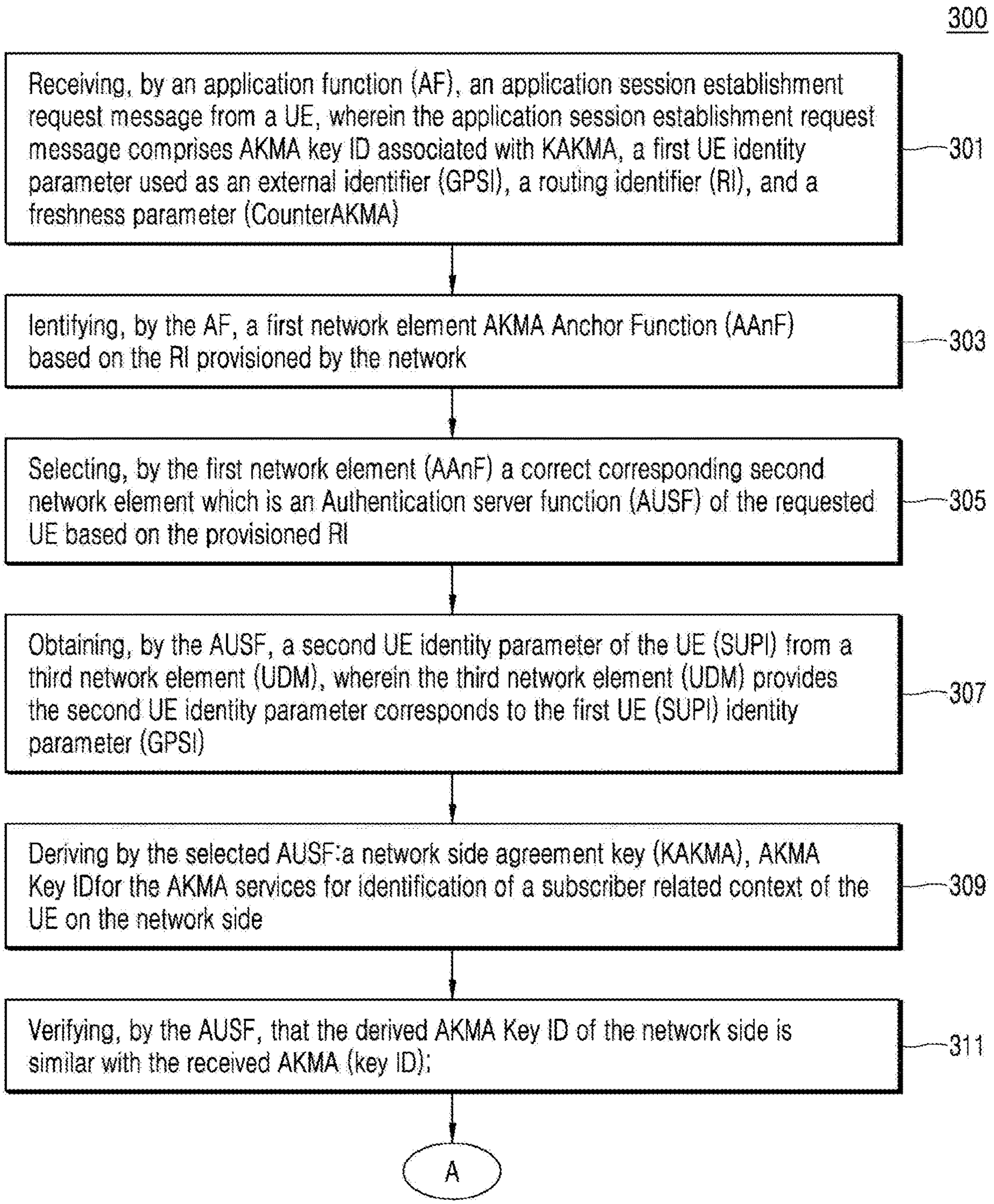
FIG. 3A illustrates a flow chart for generating an Application specific keys for obtaining Authentication and Key Agreement for Applications (AKMA) services to establish a secure interface between a user equipment (UE) and an Application function (AF) in a wireless communication network, according to an embodiment of the present disclosure.
Figure 3B:
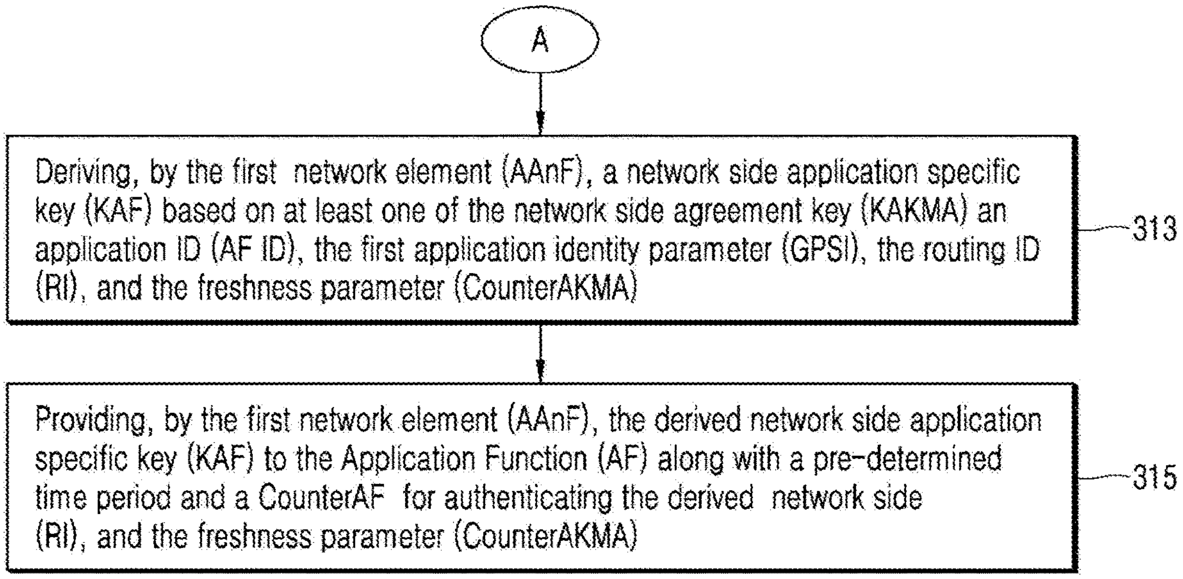
FIG. 3B illustrates a flow chart for generating an Application specific keys for obtaining Authentication and Key Agreement for Applications (AKMA) services to establish a secure interface between a user equipment (UE) and an Application function (AF) in a wireless communication network, according to an embodiment of the present disclosure.

FIG. 3A and 3B illustrates a flow chart for generating an Application specific keys for obtaining Authentication and Key Agreement for Applications (AKMA) services to establish a secure interface between a user equipment (UE) and an Application function (AF) in a wireless communication network, according to an embodiment of the present disclosure.

In an implementation as depicted in FIG. 3A and 3B, the present subject matter refers to a method of generating an Application specific keys for obtaining Authentication and Key Agreement for Applications (AKMA) services to establish a secure interface between a user equipment (UE) and an Application function (AF) in a wireless communication network. The method 300 is performed at a network side.

According to an embodiment of the present disclosure, the method 300 at a step 301, an application function (AF) receives an application session establishment request message from a UE, wherein the application session establishment request message comprises AKMA key ID associated with KAKMA, a first UE identity parameter used as an external identifier (GPSI), a routing identifier (RI), and a freshness parameter. As an example, the application function (AF) may be a third party entity, the first application identity parameter of UE may be GPSI, UE identifier on the UE side may be a key ID, and the freshness parameter Counter-AKMA.

Now, step 303, the AF identifies a first network element AKMA Anchor Function (AAnF) based on the RI provisioned by the network. In particular, the AF identifies the AAnF which is referred as a first network element without deviating from the scope of the invention.

In a further implementation, the first network element (AAnF) sends an AKMA key request comprising the UE side authentication token, a UE identifier on UE side, the first application identity parameter (GPSI), the second application identity parameter (SUPI), the RI, and the freshness parameter.

Thereafter, step 305, the first network element (AAnF) selects a correct corresponding second network element which is an Authentication server function (AUSF) of the requested UE based on the RI.

Then at step 307 the AUSF, obtains a second UE identity parameter of the UE from a third network element, wherein the third network element provides the second UE identity parameter corresponds to the first UE identity parameter (SUPI). As an example, the third network element may be a UDM (Unified Data Management), and the second UE identity parameter of the UE may be a SUPI without deviating from the scope of the invention.

Thereafter, at step 309, the selected AUSF derives a network side agreement key based on at least one of the first application identity parameter, the second application identity parameter, RI, RAND and the freshness parameter. The selected AUSF further derives AKMA Key ID for the AKMA services for identification of a subscriber related context of the UE on the network side. As an example, the network side agreement key may be a KAKMA, the UE identifier may be a Key ID derived at the network side without deviating from the scope of the invention.

After that at step 311, the AUSF verifies the AKMA key ID (Key ID) of the network side is being similar with the received Key ID.

After that at step 313, the first network element (AAnF) derives a network side application specific key based on at least one of the network side agreement key (KAKMA), an application ID (AF ID), the first application identity parameter (GPSI), the routing ID (RI), and the freshness parameter (CounterAKMA). As an example, the AF ID identifies which application of the AF is issuing the application session establishment request. As an example, network side application specific key may be a KAF without deviating from the scope of the invention.

At step 315, the first network element (AAnF) provides the derived network side application specific key (KAF) to the Application Function (AF) along with a pre-determined time period and a CounterAF for authenticating the derived network side application specific key (KAF) at the UE in order to establish a secure interface between the UE and the Application Function (AF).

In a further implementation, subsequent to the step 315, the first network element (AAnF) generates a network side MAC-I based on the KAF derived by the first network element (AAnF). Then, sends the generated network side MAC-I to the AF. Thereafter, the first network element AAnF sends an application session establishment response comprising the freshness parameter and the network side MAC-I to the UE for further authentication process. In particular, the AF sends an application session establishment response to the UE to establish the secure interface between the UE and the Application Function (AF). Further, the pre-determined time period and the CounterAF are also included in the application session establishment response.

In a yet further implementation, after sending the application session establishment response by the AF to the UE at step 315, the UE generates the UE side application specific key (KAF) based on at least one of the UE side agreement key (KAKMA), the application ID (AF ID), the first application identity parameter (GPSI), the routing ID RI, and the freshness parameter (CounterAKMA). Thereafter, the UE further derives a UE side MAC-I after the reception of the application session establishment response from the AF. Then the UE verifies whether the UE side MAC-I matches with the network side MAC-I referred as key establishment procedure, thereafter, on successful result of verification the UE establishes a secure interface between the UE and the Application Function (AF).

Now, before the implementation of the step 301, the UE generates a UE side agreement key (KAKMA) based on at least one of the first application identity parameter (GPSI), the second application identity parameter (SUPI), the RI, and the freshness parameter (CounterAKMA). The UE further generates the UE side authentication token (Key ID) based on at least one of the first application identity parameter (GPSI), the RI, and the freshness parameter (CounterAKMA). The UE, thus further provides the UE identifier of the UE side authentication token (Key ID) to the AF in the application session establishment request message.

Figure 4:
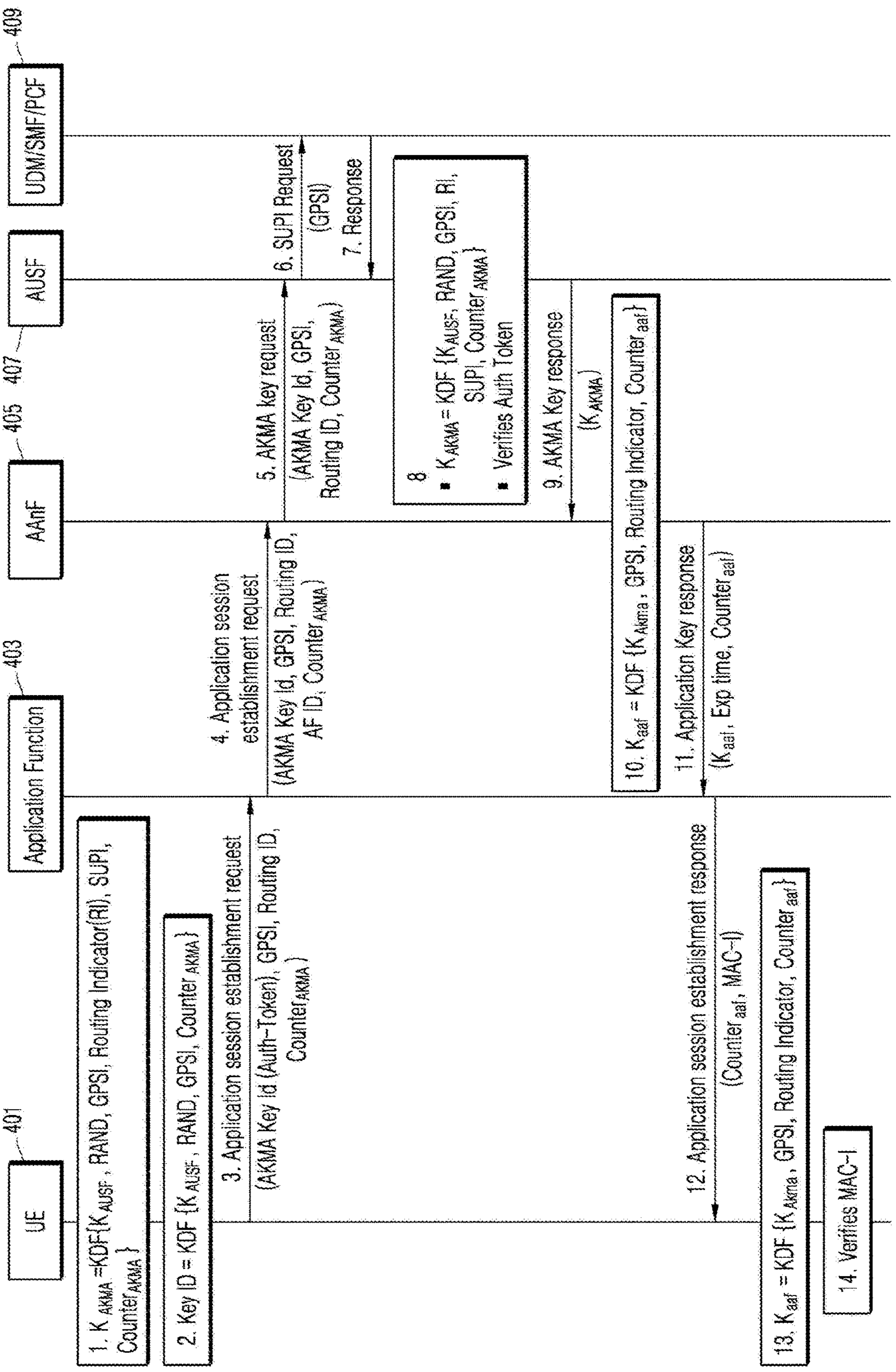
FIG. 4 illustrates message flow for implementing the method of FIGS. 3*a* and 3*b* as alternative 1 solution , according to an embodiment of the present disclosure.

FIG. 4 illustrates a detailed implementation of a method 300 as explained in the FIGS. 3A and 3B, in accordance with an embodiment of the present disclosure.

Step 1 which is before the implementation of the step 301 as described in the FIG. 2: The UE 401 derives the key KAKMA, as follows:

KAKMA=KDF (KAUSF, RAND, GPSI, Routing Indicator (RI), SUPI, CounterAKMA, other possible parameters)

SUPI is provided as one of the input parameter to derive KAKMA, which is used to differentiate each subscriber that is requesting for various AKMA services.

The UE 401 and the AUSF 407 shall associate a counter, CounterAKMA, with the key KAUSF. The CounterAKMA shall be incremented by the UE for every new computation of the KAKMA. The CounterAKMA is used as freshness input parameter into KAKMA derivation, to mitigate the replay attack.

Step 2: Further, the UE 401 derives an identity for the derived KAKMA (Key ID), as follows:

Key ID=KDF (KAUSF, RAND, GPSI, CounterAKMA, other possible parameters). The Key ID is referred as UE identifier on the UE side as it is generate at the UE end.

To derive a new UE identifier for AKMA service to identify a subscriber related context of the UE 401, without sending any 3GPP specific identities like SUCI, GUTI, SUPI or provisioning by the network like GUTI, Resume ID. The Key ID may be a message authentication token and will be used by the UE and AAnF, to identify the KAKMA.

Step 3 corresponds to step 301 of the FIGS. 3A and 3B: The UE 401 initiates application session establishment by sending application session establishment request to the application function. The UE 401 includes at least one of the following parameters in the request message: AKMA Key Id (as the Auth-Token), GPSI, Routing ID, CounterAKMA.

The UE includes the Routing ID provisioned by the HPLMN, to identify appropriate AUSF (which is in possession of the key KAUSF).

The GPSI is UE's ID, which uniquely identify the UE in the AKMA service.

Step 4: On receiving the application session establishment request from the UE 401, the AF 403 resolves the AAnF 405, either reaching the NEF with the Routing ID or AF is preconfigured with the AAnF details. Then the AF 403 relays/forwards the request message with the relevant parameters received from the UE, to the AAnF 405.

Step 5 corresponds to step 305 of the FIGS. 3A and 3B: On receiving the request from AF 403, the AAnF 405 identifies the appropriate AUSF 407, which is in possession of the KAUSF for the UE 401.

In an embodiment, the AAnF 405 identifies the AUSF 407, using the routing ID provided by the UE 401. In an alternative embodiment, the AAnF 405 is pre-configured with the AUSF details (for identification and routing) to contact.

Step 6 corresponds to step 307 of the FIGS. 3A and 3B: The AUSF 407 to identify KAUSF corresponding to the UE 401, it requires SUPI of the UE 401. Therefore, the AUSF 407 initiates request to the UDM 409, to obtain the SUPI and/or subscription data (which contains the mapping of SUPI and the GSPI) corresponding to the GPSI.

Step 7: The UDM 409 provides the SUPI and/or the subscription data to the AUSF 407, corresponding to the GPSI.

The UDM provides 409 the GPSI and/or subscription data to the AAnF, corresponding to the SUPI.

Step 8 corresponds to steps 309, 311 of the FIGS. 3A and 3B: Once KAUSF is identified using the SUPI, the AUSF 407 derives the key KAKMA and the Key ID (as detailed in the Step 1 and Step 2).

The AUSF 407 shall only accept CounterAKMA value that is greater than stored CounterAKMA value. The AUSF 407 shall store the received CounterAKMA, only if the verification of the received Auth token is successful.

The AUSF 407 verifies whether the derived Auth token is same as the received Token. If it is same, then the AUSF proceeds further.

Step 9: The AUSF 407 provides the derived key KAKMA to the AAnF 405 in AKMA key response message.

Step 10 corresponds to steps 313 of the FIGS. 3A and 3B: The AAnF 407 derives the AF specific key KAF referred as the network side application specific key, as follows:

Kaaf=KDF {KAKMA, GPSI, AF ID, Routing Indicator, CounterAF, other possible parameters}

The format of AF ID is as follows;

AF ID=FQDN of AF||Ua* security protocol identifier

The AF ID is used to identify which application the AF is issuing the request. In this way, by adding AF ID as one of the input parameter for KAF derivation, the key separation is achieved.

The AAnF 405 and the UE 104 shall associate a counter, CounterAF, with the key KAF. The CounterAF shall be incremented by the AAnF 405 for every new computation of the KAF. The CounterAF is used as freshness input into KAF derivation, to mitigate the replay attack.

Step 11 corresponds to steps 315 of the FIGS. 3A and 3B: The AAnF 405 provides the derived key KAF to the AF 403, along with the explicit time and CounterAF.

If the KAF keys are already available for the UE in the AAnF, then AAnF will skip requesting the keys (KAF) from AUSF It is necessary for the anchor function to notify the application function about the validity of the derived Kaaf. The Kaaf may be provided with a maximum lifetime. When the application key lifetime is expired, it shall be renegotiated.

Step 12 corresponds to steps 315 of the FIGS. 3A and 3B: On receiving the application key response message from the AAnF 405, the AF 403 sends the Application session establishment response to the UE. The response message includes the CounterAF and the MAC-I derived on the response message.

Step 13: The UE 401 derives the AF specific key KAF as detailed in the step 10 after sending the application session establishment response by the AF to the UE at step 12 (step 315).

Step 14: Using the derived key KAF, the UE 401 verifies the received MAC-I.

The UE 401 shall only accept CounterAF value that is greater than stored CounterAF value. The UE shall store the received CounterAF, only if the verification of the received MAC-I is successful.

MAC-I is used to authenticate the AKMA anchor function.

If the verification is successful, then the key establishment procedure is successful.

In another embodiment, it is considered that the application function is reaching the 5GC network indirectly (via NEF) i.e., if the operator does not allow the application function to access the network directly, the AF shall use the NEF to interact indirectly with the 5GC. When the NEF processes the AF request, the AF-Service-Identifier shall be used to authorize the AF request.

In another embodiment, it is considered that the identification of the AAnF using the Routing Identifier is provisioned by the network The AF ID is used for the key derivation, key separation and for providing freshness for the Kaaf.

The format of AF ID is as follows;

AF ID=FQDN of AF||Ua* security protocol identifier

Where Ua* security protocol identifier indicates which security protocol is used for the communication between UE and the application function. There can be multiple security protocols running between UE and the application function depends on the application requirement.

Figure 5:
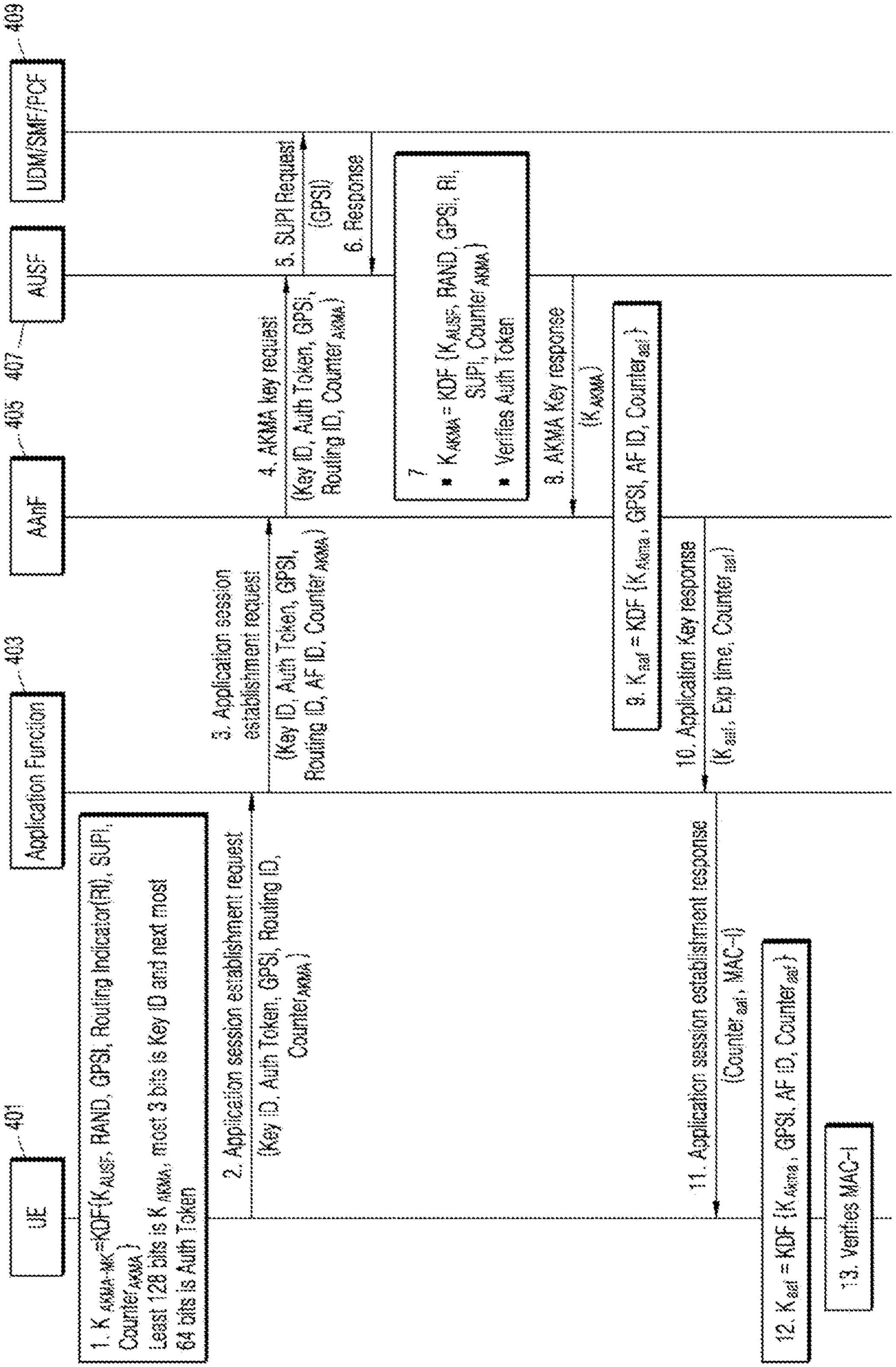
FIG. 5 illustrates an alternative embodiment of the method implemented at FIG. 4 as alternative 2 solution, according to an embodiment of the present disclosure.

FIG. 5 illustrates an alternative embodiment of the method implemented at FIG. 4, according to an embodiment of the present disclosure. The explanation will be made by referring to the FIGS. 3A, 3B, and 4. Present embodiment defines a format of the UE or the network side agreement key (KAKMA), UE identifier (Key ID), the UE side authentication token in a bit wise format. Rest of the steps remains same as explained in the FIGS. 3A, 3B, and 4. Further, for the sake of brevity the reference numerals has not been repeated here. Further similar steps may be omitted from here as and when applicable, without deviating from the scope of the invention.

Step 1 corresponds to step 1 as described in the FIG. 4: The UE derives the AKMA master key KAKMA-MK, as follows:

KAKMA-MK=KDF (KAUSF, RAND, GPSI, Routing Indicator (RI), SUPI, CounterAKMA, other possible parameters)

SUPI is provided as one of the input parameter to derive KAKMA, which is used to differentiate each subscriber that is requesting for various AKMA services The UE and the AUSF shall associate a counter, CounterAKMA, with the key KAUSF. The CounterAKMA shall be incremented by the UE for every new computation of the KAKMA-MK. The CounterAKMA is used as freshness input into KAKMA derivation, to mitigate the replay attack.

According to another aspect of this embodiment, AUSF derives (256 bits) key KAKMA-MK. Part of the derived key KAKMA-MK is taken as KAKMA, Key ID and the Auth Token. For illustration propose, the KAKMA is identified with the 128 least significant bits (LSBs) of the output of the KDF (KAKMA-MK), the Key ID is identified with the 3 most significant bits (MSBs) of the output of the KDF and next 64 most significant bits (MSBs) of the output of the KDF is identified as Authentication token.

In this variant, Key ID is not derived separately, instead the MSB 3 bits are considered as the key ID and also the next 64 MSB bits are considered as Auth Token.

Step 2 corresponds to step 3 of the FIG. 4: The UE initiates application session establishment by sending application session establishment request to the application function. The UE includes at least one of the following parameters in the request message: AKMA Key Id, Auth-Token, GPSI, Routing ID, CounterAKMA.

The UE includes the Routing ID provisioned by the HPLMN, to identify appropriate AUSF (which is in possession of the key KAUSF).

The GPSI is UE's ID, which uniquely identify the UE in the AKMA service.

Step 3 corresponds to step 4 of the FIG. 4: On receiving the application session establishment request from the UE, the AF resolves the AAnF, either reaching the NEF with the Routing ID or AF is preconfigured with the AAnF details. Then the AF relays/forwards the request message with the relevant parameters received from the UE, to the AAnF.

Step 4 corresponds to step 5 of the FIG. 4: On receiving the request from AF, the AAnF identifies the appropriate AUSF, which is in possession of the KAUSF for the UE. The AAnF identifies the AUSF, using the routing ID provided by the UE.

Step 5 corresponds to step 6 of the FIG. 4: The AUSF to identify KAUSF corresponding to the UE, it requires SUPI of the UE. Therefore, the AUSF initiates request to the UDM, to obtain the SUPI and/or subscription data (which contains the mapping of SUPI and the GSPI) corresponding to the GPSI.

Step 6 corresponds to step 7 of the FIG. 4: The UDM provides the SUPI and/or the subscription data to the AUSF, corresponding to the GPSI.

Step 7 corresponds to step 8 of the FIG. 4: Once KAUSF is identified using the SUPI, the AUSF derives the key KAKMA and the Key ID (as detailed in the Step 1).

The AUSF shall only accept CounterAKMA value that is greater than stored CounterAKMA value. The AUSF shall store the received CounterAKMA, only if the verification of the received Auth token is successful.

The AUSF verifies whether the derived Auth token is same as the received Token. If it is same, then the AUSF proceeds further.

Step 8 corresponds to step 9 of the FIG. 4: The AUSF provides the derived key KAKMA to the AAnF in AKMA key response message.

Step 9 corresponds to step 10 of the FIG. 4: The AAnF derives the AF specific key KAF, as follows:

Kaaf=KDF {KAkma, GPSI, Routing Indicator, AF ID, CounterAF, other possible parameters}

The format of AF ID is as follows;

AF ID=FQDN of AF||Ua* security protocol identifier

The AF ID is used to identify which application the AF is issuing the request. In this way, by adding AF ID as one of the input parameter for KAF derivation, the key separation is achieved.

The AAnF and the UE shall associate a counter, CounterAF, with the key KAF. The CounterAF shall be incremented by the AAnF for every new computation of the KAF. The CounterAF is used as freshness input into KAF derivation, to mitigate the replay attack.

In this variant for deriving application specific key, the AF ID provided by the AF is also used one of the input parameter for deriving the application key.

Step 10 corresponds to step 11 of the FIG. 4: The AAnF provides the derived key KAF to the AF, along with the explicit time and CounterAF.

If the KAF keys are already available for the UE in the AAnF, then AAnF will skip requesting the keys (KAF) from AUSF Step 11 corresponds to step 12 of the FIG. 4: On receiving the application key response message from the AAnF, the AF sends the Application session establishment response to the UE. The response message includes the CounterAF and the MAC-I derived on the response message.

Step 12 corresponds to step 13 of the FIG. 4: The UE derives the AF specific key KAF as detailed in the step 9.

Step 13 corresponds to step 14 of the FIG. 4: Using the derived key KAF, the UE verifies the received MAC-I.

The UE shall only accept CounterAF value that is greater than stored CounterAF value. The UE shall store the received CounterAF, only if the verification of the received MAC-I is successful.

MAC-I is used to authenticate the AKMA anchor function.

If the verification is successful, then the key establishment procedure is successful.

Figure 6:
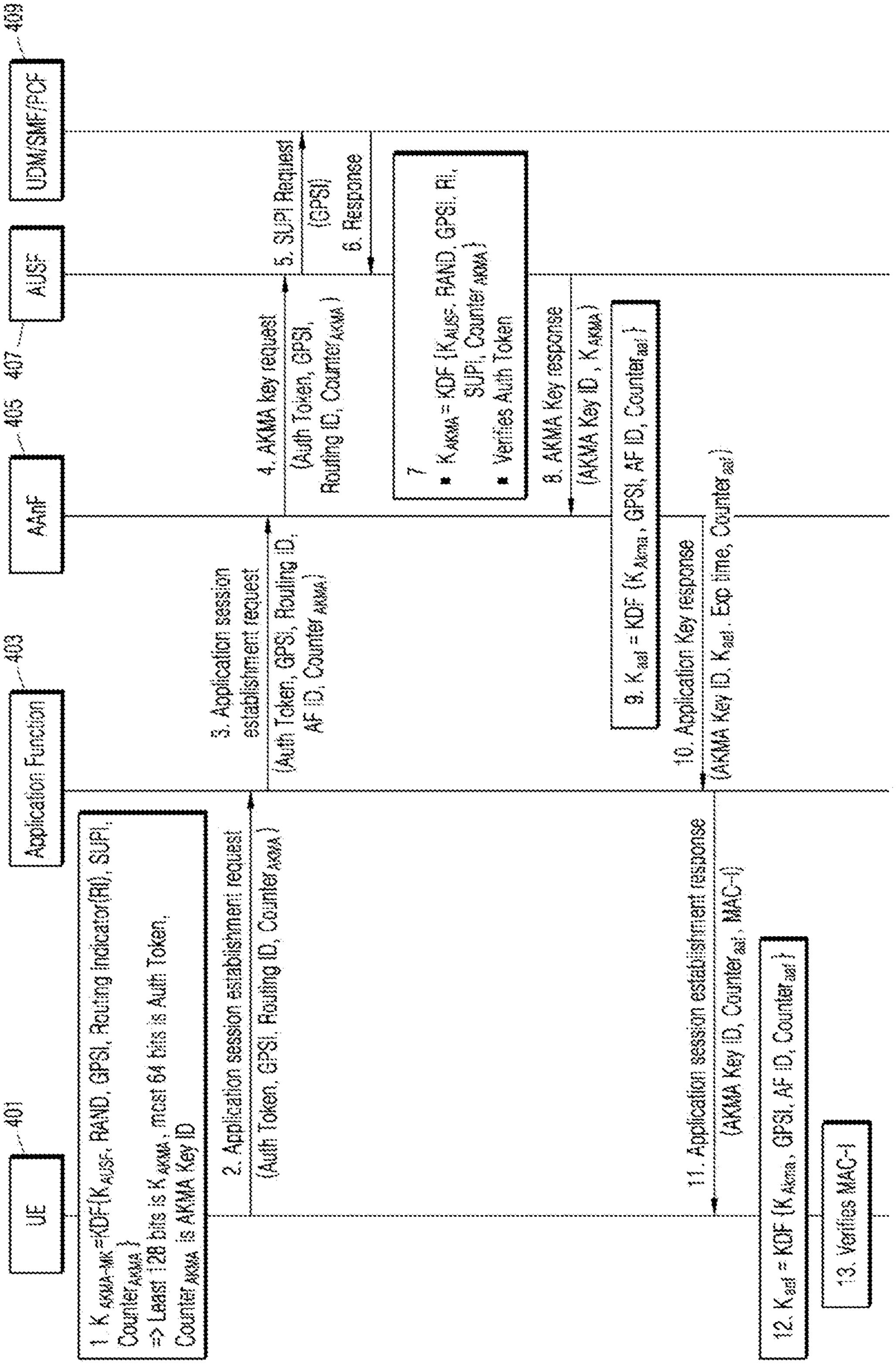
FIG. 6 illustrates an alternative embodiment of the method implemented at FIG. 4 as alternative 3 solution, according to an embodiment of the present disclosure.

FIG. 6 illustrates an alternative embodiment of the method implemented at FIG. 4, according to an embodiment of the present disclosure. The explanation will be made by referring to the FIGS. 3A, 3B, 4, and 5. Present embodiment defines a format of the UE or the network side agreement key (KAKMA), UE identifier (Key ID), the UE side authentication token in a bit wise format. Rest of the steps remains same as explained in the FIGS. 3A, 3B, and 4. For the sake of brevity the reference numerals has not been repeated here. Further similar steps may be omitted from here as and when applicable, without deviating from the scope of the invention.

Step 1 which is before the implementation of the step 301 as described in the FIG. 2: The UE derives the AKMA master key KAKMA-MK, as follows:

KAKMA-MK=KDF (KAUSF, RAND, GPSI, Routing Indicator (RI), SUPI, CounterAKMA, other possible parameters)

SUPI is provided as one of the input parameter to derive KAKMA, which is used to differentiate each subscriber that is requesting for various AKMA services According to another aspect of this embodiment, the UE and the AUSF shall associate a counter, CounterAKMA which is also considered as AKMA Key ID with the key KAUSF. The CounterAKMA shall be incremented by the UE for every new computation of the KAKMA. The CounterAKMA is used as freshness input into KAKMA derivation, to mitigate the replay attack. Also, CounterAKMA (when equivalent to Key ID) is a message authentication token and will be used by the UE and AAnF, to identify the KAKMA.

According to another aspect of this embodiment, AUSF derives (256 bits) key KAKMA-MK. Part of the derived key KAKMA-MK is taken as KAKMA and the Auth Token. For illustration propose, the KAKMA is identified with the 128 least significant bits (LSBs) of the output of the KDF (KAKMA-MK), and 64 most significant bits (MSBs) of the output of the KDF is identified as Authentication token. The value of the CounterAKMA is taken as the value of the AKMA Key ID.

Step 2 corresponds to step 3 of the FIG. 4: The UE initiates application session establishment by sending application session establishment request to the application function. The UE includes at least one of the following parameters in the request message: Auth-Token, GPSI, Routing ID, CounterAKMA.

The UE includes the Routing ID provisioned by the HPLMN, to identify appropriate AUSF (which is in possession of the key KAUSF).

The GPSI is UE's ID, which uniquely identify the UE in the AKMA service.

Step 3 corresponds to step 4 of the FIG. 4: On receiving the application session establishment request from the UE, the AF resolves the AAnF, either reaching the NEF with the Routing ID or AF is preconfigured with the AAnF details. Then the AF relays/forwards the request message with the relevant parameters received from the UE, to the AAnF.

Step 4 corresponds to step 5 of the FIG. 4: On receiving the request from AF, the AAnF identifies the appropriate AUSF, which is in possession of the KAUSF for the UE. The AAnF identifies the AUSF, using the routing ID provided by the UE.

Step 5 corresponds to step 6 of the FIG. 4: The AUSF to identify KAUSF corresponding to the UE, it requires SUPI of the UE. Therefore, the AUSF initiates request to the UDM, to obtain the SUPI and/or subscription data (which contains the mapping of SUPI and the GSPI) corresponding to the GPSI.

Step 6 corresponds to step 7 of the FIG. 4: The UDM provides the SUPI and/or the subscription data to the AUSF, corresponding to the GPSI.

Step 7 corresponds to step 8 of the FIG. 4: Once KAUSF is identified using the SUPI, the AUSF derives the key KAKMA and the Key ID (as detailed in the Step 1).

The AUSF shall only accept CounterAKMA value that is greater than stored CounterAKMA value. The AUSF shall store the received CounterAKMA, only if the verification of the received Auth token is successful.

The AUSF verifies whether the derived Auth token is same as the received Token. If it is same, then the AUSF proceeds further.

Step 8 corresponds to step 9 of the FIG. 4: The AUSF provides the derived key KAKMA to the AAnF in AKMA key response message.

Step 9 corresponds to step 10 of the FIG. 4: The AAnF derives the AF specific key KAF, as follows:

Kaaf=KDF {KAkma, GPSI, AF ID, CounterAF, other possible parameters}

The format of AF ID is as follows;

AF ID=FQDN of AF||Ua* security protocol identifier

The AF ID is used to identify which application the AF is issuing the request. In this way, by adding AF ID as one of the input parameter for KAF derivation, the key separation is achieved The AAnF and the UE shall associate a counter, CounterAF, with the key KAF. The CounterAF shall be incremented by the AAnF for every new computation of the KAF. The CounterAF is used as freshness input into KAF derivation, to mitigate the replay attack.

In this variant for deriving application specific key, the AF ID provided by the AF is also used as one of the input parameter for deriving the application key.

Step 10 corresponds to step 11 of the FIG. 4: The AAnF provides the derived key KAF to the AF, along with the explicit time and CounterAF.

If the KAF keys are already available for the UE in the AAnF, then AAnF will skip requesting the keys (KAF) from AUSF.

Step 11 corresponds to step 12 of the FIG. 4: On receiving the application key response message from the AAnF, the AF sends the Application session establishment response to the UE. The response message includes the CounterAF and the MAC-I derived on the response message.

Step 12 corresponds to step 13 of the FIG. 4: The UE derives the AF specific key KAF as detailed in the step 9.

Step 13 corresponds to step 14 of the FIG. 4: Using the derived key KAF, the UE verifies the received MAC-I.

The UE shall only accept CounterAF value that is greater than stored CounterAF value. The UE shall store the received CounterAF, only if the verification of the received MAC-I is successful.

MAC-I is used to authenticate the AKMA anchor function.

If the verification is successful, then the key establishment procedure is successful.

Figure 7:
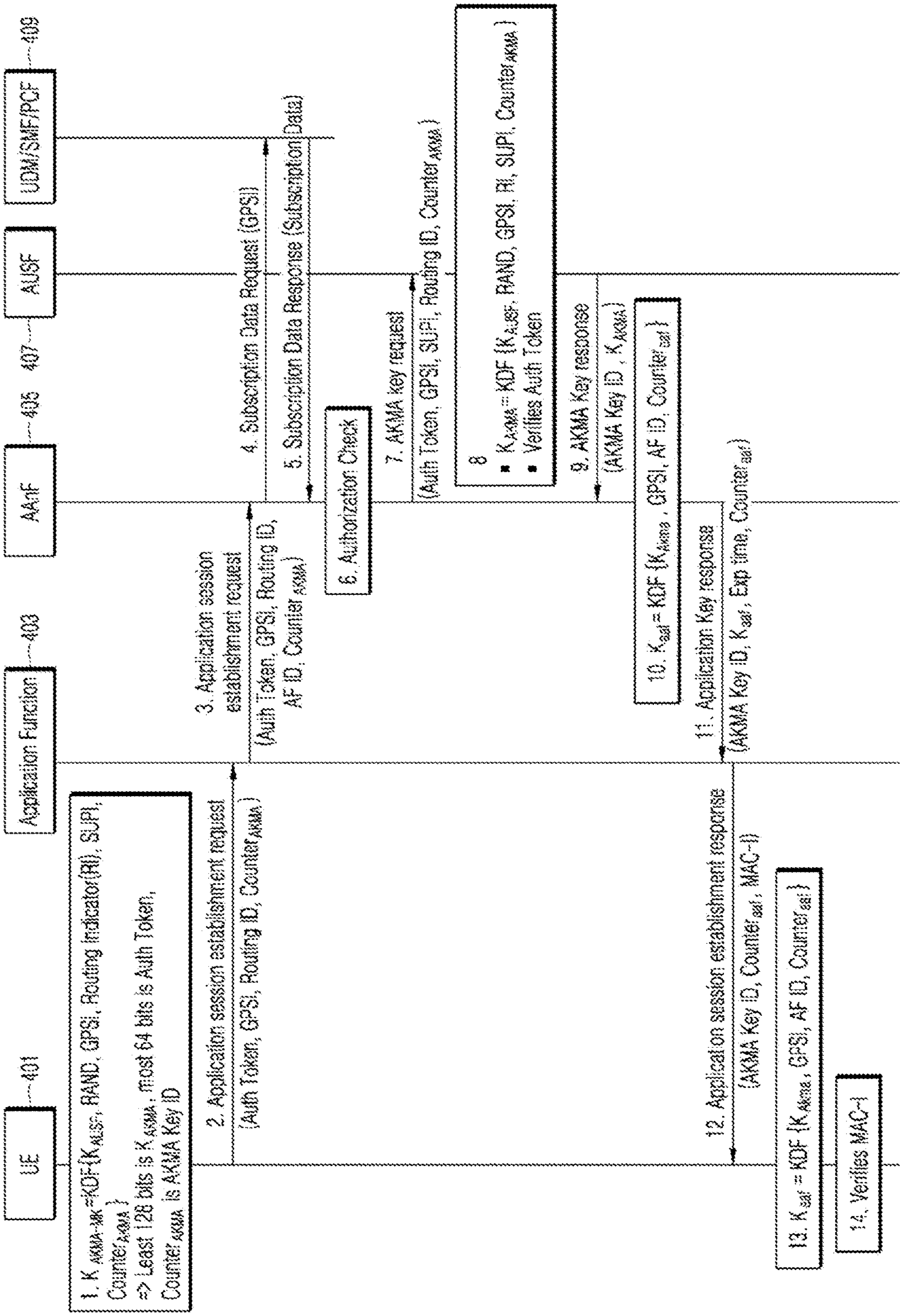
FIG. 7 illustrates an alternative embodiment of the method implemented at FIG. 4 as alternative 4 solution, according to an embodiment of the present disclosure.

FIG. 7 illustrates an alternative embodiment of the method implemented at FIG. 4, according to an embodiment of the present disclosure. The explanation will be made by referring to the FIGS. 3A, 3B, 4, 5, and 6. According to an embodiment of the present disclosure, the AAnF communicate with the third network element UDM/SMF/PCF without intervening through AUSF. Further, the AAnF performs and additional authorization check for the identification parameters. Rest of the steps remains same as explained in the FIGS. 3A, 3B, 4, 5, and 6. The message flow of the same will be explained in details below. For the sake of brevity the reference numerals has not been repeated here. Further similar steps may be omitted from here as and when applicable, without deviating from the scope of the invention.

Step 1 corresponds to step 1 as described in the FIG. 4: The UE derives the AKMA master key KAKMA-MK, as follows:

KAKMA-MK=KDF (KAUSF, RAND, GPSI, Routing Indicator (RI), SUPI, CounterAKMA, other possible parameters)

SUPI is provided as one of the input parameter to derive KAKMA, which is used to differentiate each subscriber that is requesting for various AKMA services According to another aspect of this embodiment, the UE and the AUSF shall associate a counter, CounterAKMA which is also considered as AKMA Key ID with the key KAUSF. The CounterAKMA shall be incremented by the UE for every new computation of the KAKMA. The CounterAKMA is used as freshness input into KAKMA derivation, to mitigate the replay attack. Also, CounterAKMA (when equivalent to Key ID) is a message authentication token and will be used by the UE and AAnF, to identify the KAKMA AUSF derives (256 bits) key KAKMA-MK. Part of the derived key KAKMA-MK is taken as KAKMA and the Auth Token. For illustration propose, the KAKMA is identified with the 128 least significant bits (LSBs) of the output of the KDF (KAKMA-MK), and 64 most significant bits (MSBs) of the output of the KDF is identified as Authentication token. The value of the CounterAKMA is taken as the value of the AKMA Key ID.

Step 2 corresponds to step 3 of the FIG. 4: The UE initiates application session establishment by sending application session establishment request to the application function. The UE includes at least one of the following parameters in the request message: Auth-Token, GPSI, Routing ID, CounterAKMA.

The UE includes the Routing ID provisioned by the HPLMN, to identify appropriate AUSF (which is in possession of the key KAUSF).

The GPSI is UE's ID, which uniquely identify the UE in the AKMA service.

Step 3 corresponds to step 4 of the FIG. 4: On receiving the application session establishment request from the UE, the AF resolves the AAnF, either reaching the NEF with the Routing ID or AF is preconfigured with the AAnF details. Then the AF relays/forwards the request message with the relevant parameters received from the UE, to the AAnF.

Step 4: The AAnF identifies the UDM, using the routing ID provided by the UE. Further, for the AUSF to identify KAUSF corresponding to the UE, it requires SUPI of the UE. Therefore, the AAnF initiates request to the UDM directly without intervening through the AUSF, to obtain the SUPI and/or subscription data (which contains the mapping of SUPI and the GSPI) corresponding to the GPSI.

Step 5: The UDM provides the SUPI and/or the subscription data to the AAnF, corresponding to the GPSI.

The UDM provides 409 the GPSI and/or subscription data to the AAnF, corresponding to the SUPI.

Step 6: The AAnF perform authorization check of the UE based on the received subscription data, if received in step 5. Otherwise, this step is skipped. If authorization check is performed by the AAnF, then the AAnF proceed further with the below steps only if the authorization check is successful, otherwise the AAnF rejects the request.

Step 7 corresponds to step 5 of the FIG. 4: The AAnF sends AKMA key request to the UDM. The AAnF includes the following parameters in the request: Auth Token, GPSI, SUPI, Routing ID, CounterAKMA, other possible parameters.

Step 8 corresponds to step 8 of the FIG. 4: The AUSF derives the KAKMA as follows (similar to step 1 derived by the UE):

KAKMA=KDF {KAUSF, RAND, GPSI, Routing Indicator, SUPI, CounterAKMA, Other possible parameters}

SUPI is provided as one of the input parameter to derive KAKMA, which is used to differentiate each subscriber that is requesting for various AKMA services The AUSF verifies whether the derived Auth token is same as the received Token. If it is same, then the AUSF proceeds further.

Step 9 corresponds to step 9 of the FIG. 4: The AUSF provides the derived key KAKMA and the Key ID/CounterAKMA to the AAnF in AKMA key response message.

Step 10 corresponds to step 10 of the FIG. 4: On receiving the AKMA key response message from the AUSF, the AAnF derives Kaaf as follows:

Kaaf=KDF {KAKMA, GPSI, AF ID, Counteraaf}

The format of AF ID is as follows;

AF ID=FQDN of AF||Ua* security protocol identifier

The AF ID is used to identify which application the AF is issuing the request. In this way, by adding AF ID as one of the input parameter for KAF derivation, the key separation is achieved Step 11 corresponds to step 11 of the FIG. 4: The AAnF sends the application key response to the Application function. The parameters included in this message are: AKMA key ID (CounterAKMA), Kaaf, exp time, Counteraaf, other possible parameters.

If the KAF keys are already available for the UE in the AAnF, then AAnF will skip requesting the keys (KAF) from AUSF Step 12 corresponds to step 12 of the FIG. 4: On receiving the application key response message from the AAnF, the AF sends the Application session establishment response to the UE. The response message includes the AKMA key ID, CounterAF and the MAC-I derived on the response message.

Step 13 corresponds to step 13 of the FIG. 4: The UE derives the AF specific key KAF as detailed in the step 10.

Step 14 corresponds to step 14 of the FIG. 4: Using the derived key KAF, the UE verifies the received MAC-I.

The UE shall only accept CounterAF value that is greater than stored CounterAF value.

The UE shall store the received CounterAF, only if the verification of the received MAC-I is successful.

MAC-I is used to authenticate the AKMA anchor function.

If the verification is successful, then the key establishment procedure is successful.

Figure 8:
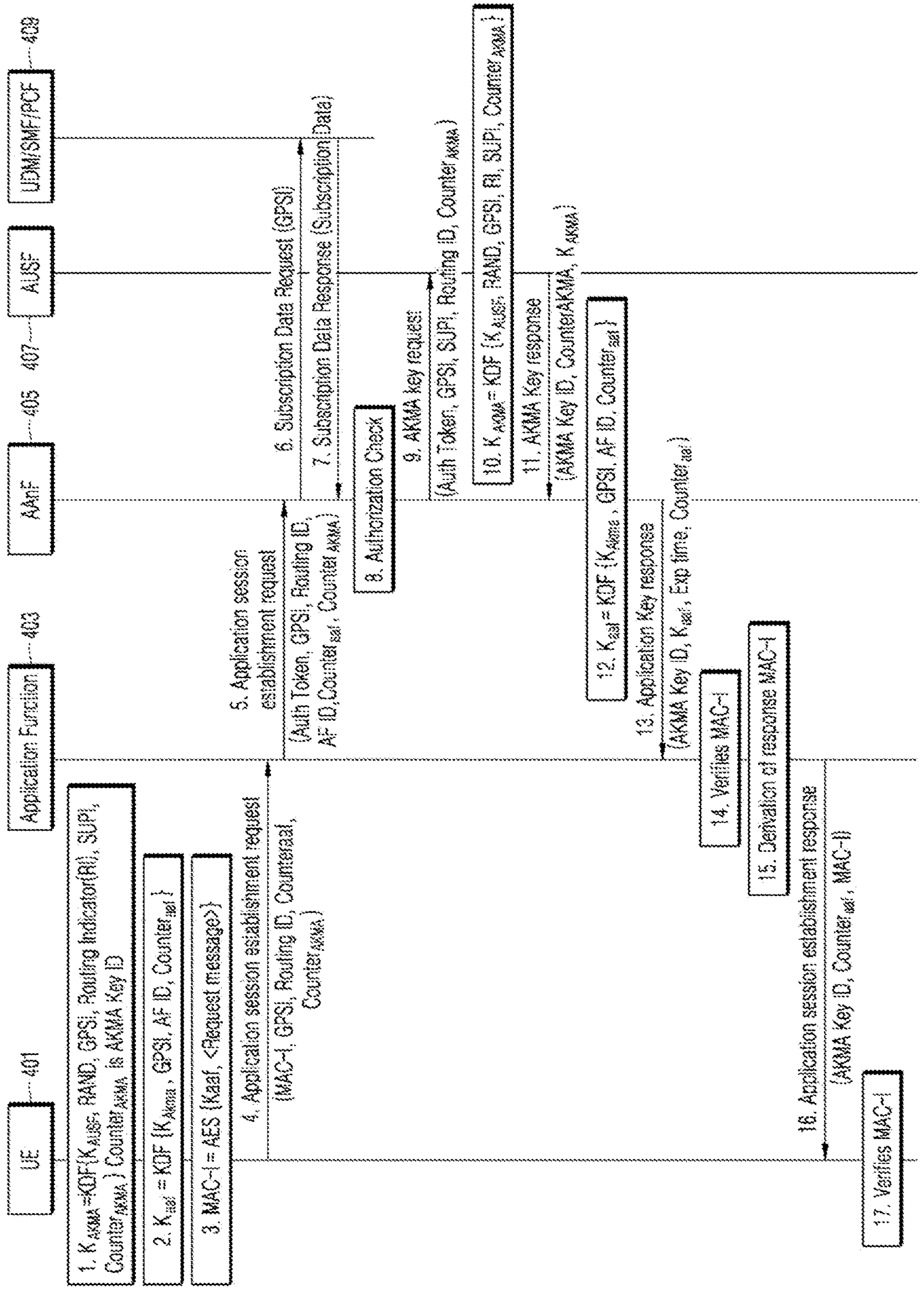
FIG. 8 illustrates an alternative embodiment of the method implemented at FIG. 4 as alternative 5 solution, according to an embodiment of the present disclosure.

FIG. 8 illustrates an alternative embodiment of the method implemented at FIG. 4, according to an embodiment of the present disclosure. The explanation will be made by referring to the FIGS. 3A, 3B, 4, 5, 6, and 7. According to an embodiment of the present disclosure, the KAKMA may be derived by the AUSF. Further, according to an embodiment of the invention, the AF derives the MAC-I and verifies the same. Rest of the steps remains same as explained in the FIGS. 4, and 7. For the sake of brevity the reference numerals has not been repeated here. Further similar steps may be omitted from here as and when applicable, without deviating from the scope of the invention. The message flow of the same will be explained in detail below.

Step 1 corresponds to the step 1 of the FIG. 4: The UE derives the key KAKMA, as follows:

KAKMA=KDF (KAUSF, RAND, GPSI, Routing Indicator (RI), SUPI, CounterAKMA, other possible parameters)

SUPI is provided as one of the input parameter to derive KAKMA, which is used to differentiate each subscriber that is requesting for various AKMA services The UE and the AUSF shall associate a counter, CounterAKMA, with the key KAUSF, where CounterAKMA is considered as the AKMA Key ID. The CounterAKMA shall be incremented by the UE for every new computation of the KAKMA. The CounterAKMA is used as freshness input into KAKMA derivation, to mitigate the replay attack. Also, CounterAKMA (when equivalent to Key ID) is a message authentication token and will be used by the UE and AAnF, to identify the KAKMA.

Step 2 corresponds to the step 2 of the FIG. 4: Further, the UE derives the key for AKMA application function as follows:

Kaaf=KDF (KAkma, GPSI, CounterAKMA, AF ID, CounterAF, other possible parameters)

The format of AF ID is as follows;

AF ID=FQDN of AF||Ua* security protocol identifier

The AF ID is used to identify which application the AF is issuing the request. In this way, by adding AF ID as one of the input parameter for KAF derivation, the key separation is achieved The UE and the AAnF shall associate a counter, CounterAF, with the key KAF. The CounterAF shall be incremented by the UE for every new computation of the KAF. The CounterAF is used as freshness input into KAF derivation, to mitigate the replay attack.

Step 3: According to the embodiment, the UE calculates or derives the MAC-I of the request message as follows:

MAC-I=AES (Kaaf, <Request message>)

The MAC-I is derived by using any of the supported algorithm. This MAC-I is used in this procedure to check for the authenticity of the AKMA Anchor Function.

Step 4 corresponds to the step 3 of the FIG. 4: The UE initiates application session establishment by sending application session establishment request to the application function. The UE includes the following parameters in the request message: MAC-I, GPSI, Routing ID, Counteraaf, CounterAKMA.

The UE includes the Routing ID provisioned by the HPLMN, to identify appropriate AUSF (which is in possession of the key KAUSF).

The GPSI is UE's ID, which uniquely identify the UE in the AKMA service.

Counteraaf and CounterAKMA is used as freshness parameter for the derivation of KAAF and KAKMA, The MAC-I of the requesting UE is added in the session establishment request and send it to AF for further verification procedure.

Step 5 corresponds to the step 4 of the FIG. 4: On receiving the application session establishment request from the UE, the AF resolves the AAnF, either reaching the NEF with the Routing ID or AF is preconfigured with the AAnF details. Then the AF relays/forwards the request message with the relevant parameters received from the UE, to the AAnF.

Step 6: The AAnF identifies the UDM, using the routing ID provided by the UE. Further, for the AUSF to identify KAUSF corresponding to the UE, it requires SUPI of the UE. Therefore, the AAnF initiates request to the UDM, to obtain the SUPI and/or subscription data (which contains the mapping of SUPI and the GSPI) corresponding to the GPSI.

Step 7: The UDM provides the SUPI and/or the subscription data to the AAnF, corresponding to the GPSI.

Step 8: The AAnF perform authorization check of the UE based on the received subscription data, if received in step 7. Otherwise, this step is skipped. If authorization check is performed by the AAnF, then the AAnF proceed further with the below steps only if the authorization check is successful, otherwise the AAnF rejects the request.

Step 9 corresponds to the step 5 of the FIG. 4: The AAnF sends AKMA key request to the AUSF. The AAnF includes the following parameters in the request: Auth Token, GPSI, SUPI, Routing ID, CounterAKMA, other possible parameters.

Step 10: The AUSF derives the KAKMA as follows:

KAKMA=KDF {KAUSF, RAND, GPSI, Routing Indicator, SUPI, CounterAKMA, other possible parameters}

SUPI is provided as one of the input parameter to derive KAKMA, which is used to differentiate each subscriber that is requesting for various AKMA services Step 11 corresponds to the step 9 of the FIG. 4: The AUSF provides the derived key KAKMA and the AKMA Key ID/CounterAKMA to the AAnF in AKMA key response message.

Step 12 corresponds to the step 10 of the FIG. 4: On receiving the AKMA key response message from the AUSF, the AAnF derives Kaaf as follows:

Kaaf=KDF {KAKMA, GPSI, AF ID, Counteraaf, other possible parameters}

If the KAF keys are already available for the UE in the AAnF, then AAnF will skip requesting the keys (KAF) from AUSF Step 13 corresponds to the step 11 of the FIG. 4: The AAnF sends the application key response to the Application function. The parameters included in this message are: AKMA key ID (CounterAKMA), Kaaf, explicit time, Counteraaf, other possible parameters.

Step 14: Using the derived key Kaaf, the AF verifies the MAC-I received from UE.

Step 15: On successful verification, the AF derives the MAC-I on the application session establishment response message.

Step 16 corresponds to the step 12 of the FIG. 4: The AF sends the Application session establishment response to the UE. The response message includes the AKMA Key ID (CounterAKMA), CounterAF, the MAC-I derived on the response message and other possible parameters.

Step 17 corresponds to the step 14 of the FIG. 4: Using the derived key KAF, the UE verifies the received MAC-I.

The UE only accepts CounterAF value that is greater than stored CounterAF value. The UE stores the received CounterAF, only if the verification of the received MAC-I is successful.

If the verification is successful, then the key establishment procedure is successful.

Figure 9:
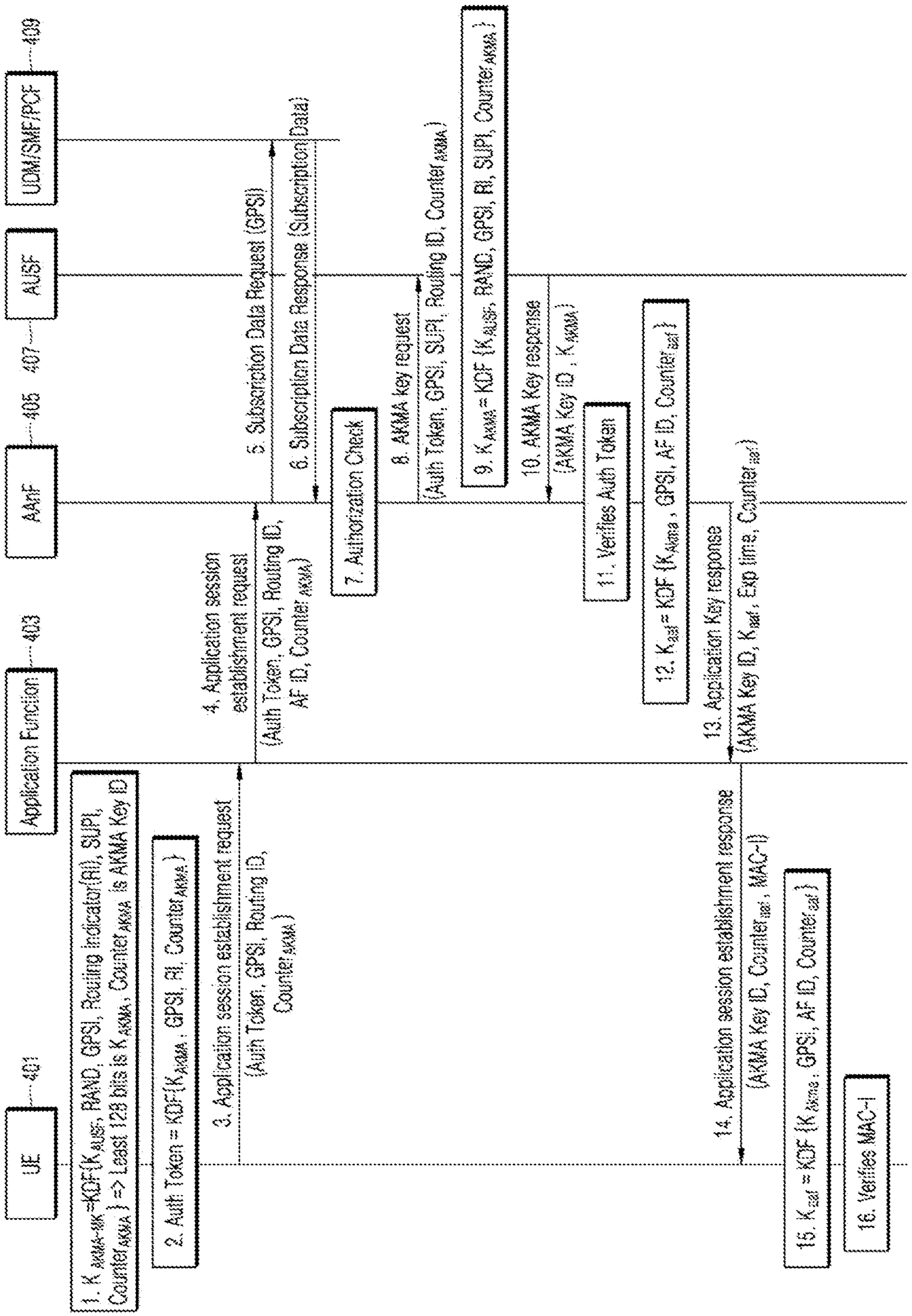
FIG. 9 illustrates an alternative embodiment of the method implemented at FIG. 4 as alternative 6 solution, according to an embodiment of the present disclosure.

FIG. 9 illustrates an alternative embodiment of the method implemented at FIG. 4, according to an embodiment of the present disclosure. The explanation will be made by referring to the FIGS. 3A, 3B, 4, 5, 6, 7, and 8. For the sake of brevity the reference numerals has not been repeated here. Further similar steps may be omitted from here as and when applicable, without deviating from the scope of the invention.

Step 1 corresponds to the step 1 of the FIG. 4: The UE derives the key KAKMA, as follows:

KAKMA-MK=KDF (KAUSF, RAND, GPSI, Routing Indicator (RI), SUPI, CounterAKMA, other possible parameters)

SUPI is provided as one of the input parameter to derive KAKMA, which is used to differentiate each subscriber that is requesting for various AKMA services From the derived KAKMA-MK which is 256 bits long, the least 128 bits can be considered as the KAKMA and the CounterAKMA is the AKMA Key ID. The CounterAKMA shall be incremented by the UE for every new computation of the KAKMA. The CounterAKMA is used as freshness input into KAKMA derivation, to mitigate the replay attack. Also, CounterAKMA (when equivalent to Key ID) is a message authentication token and will be used by the UE and AAnF, to identify the KAKMA.

Step 2: Further, the UE derives an authentication token as follows:

Auth Token=KDF {KAKMA, GPSI, RI, CounterAKMA, other possible parameters}

Step 3 corresponds to the step 3 of the FIG. 4: The UE initiates application session establishment by sending application session establishment request to the application function. The UE includes the following parameters in the request message: Auth Token, GPSI, Routing ID, CounterAKMA, other possible parameters.

The UE includes the Routing ID provisioned by the HPLMN, to identify appropriate AUSF (which is in possession of the key KAUSF) or UDM.

The GPSI is UE's ID, which uniquely identify the UE in the AKMA service.

CounterAKMA is used as freshness parameter for the derivation of CounterAKMA,

Step 4 corresponds to the step 4 of the FIG. 4: On receiving the application session establishment request from the UE, the AF relays/forwards the request message with the relevant parameters received from the UE, to the AAnF.

Step 5: The AAnF identifies the UDM, using the routing ID provided by the UE. Further, for the AUSF to identify KAUSF corresponding to the UE, it requires SUPI of the UE. Therefore, the AAnF initiates request to the UDM, to obtain the SUPI and/or subscription data (which contains the mapping of SUPI and the GSPI) corresponding to the GPSI.

Step 6: The UDM provides the SUPI and/or the subscription data to the AAnF, corresponding to the GPSI.

Step 7: The AAnF perform authorization check of the UE based on the received subscription data, if received in step 6. Otherwise, this step is skipped. If authorization check is performed by the AAnF, then the AAnF proceed further with the below steps only if the authorization check is successful, otherwise the AAnF rejects the request.

Step 8 corresponds to the step 5 of the FIG. 4: The AAnF sends AKMA key request to the UDM. The AAnF includes the following parameters in the request: Auth Token, GPSI, SUPI, Routing ID, CounterAKMA, other possible parameters.

Step 9: The AUSF derives the KAKMA (similar to step 1) as follows:

KAKMA=KDF {KAUSF, RAND, GPSI, Routing Indicator, SUPI, CounterAKMA, other possible parameters}

SUPI is provided as one of the input parameter to derive KAKMA, which is used to differentiate each subscriber that is requesting for various AKMA services Step 10: The AUSF provides the derived key KAKMA and the CounterAKMA to the AAnF.

Step 11: The AAnF verifies the Auth token received (Step 4) in the request message.

Step 12: On successful verification AAnF derives Kaaf as follows:

Kaaf=KDF {KAKMA, GPSI, AF ID, Counteraaf, other possible parameters}

The format of AF ID is as follows;

AF ID=FQDN of AF||Ua* security protocol identifier

The AF ID is used to identify which application the AF is issuing the request. In this way, by adding AF ID as one of the input parameter for KAF derivation, the key separation is achieved.

Step 13 corresponds to the step 11 of the FIG. 4: The AAnF sends the application key response to the Application function. The parameters included in this message are AKMA key ID (CounterAKMA), Kaaf, explicit time, Counteraaf, other possible parameters.

If the KAF keys are already available for the UE in the AAnF, then AAnF will skip requesting the keys (KAF) from AUSF Step 14 corresponds to the step 11 of the FIG. 4: On receiving the application key response the AF, the AF initiates the response message to the UE.

Step 15 corresponds to the step 13 of the FIG. 4: On receiving the response message, the UE derives the Kaaf as similar to step 12.

Step 16 corresponds to the step 14 of the FIG. 4: Using the derived key KAF, the UE verifies the received MAC-I.

The UE only accepts CounterAF value that is greater than stored CounterAF value. The UE stores the received CounterAF, only if the verification of the received MAC-I is successful.

If the verification is successful, then the key establishment procedure is successful.

In an embodiment, the authorization of the UE to access the AKMA service is performed by the AAnF, using the subscription data or service profile of the UE received from the UDM.

In another embodiment, the authorization of the UE to access the AKMA service is performed by the AUSF, using the subscription data or service profile of the UE received from the UDM.

In an embodiment, the AAnF identifies the AUSF using the routing ID provided by the UE.

In an embodiment, the mapping of the GPSI or AKMA Application ID of the UE (assigned by the network as part of subscription to AKMA service) or UE's Application ID or UE's public ID to the permanent ID (for example, SUPI) is performed by obtaining the subscription data or service profile from the UDM or any other network entity (for example, AMF, SMF or PCF) in the 5GC by the AAnF or by the AUSF.

In an embodiment, the AKMA Key ID is the concatenation of the Routing ID||CounterAKMA.

In an embodiment, the Key ID for KAAF is the concatenation of the Routing ID||CounterAAF. In this document, Routing ID is a value assigned by the home network operator and provisioned in the USIM, that allow together with the Home Network Identifier to route network/application signalling to AUSF and/or UDM instances capable to serve the subscriber (UE).

Figure 10:
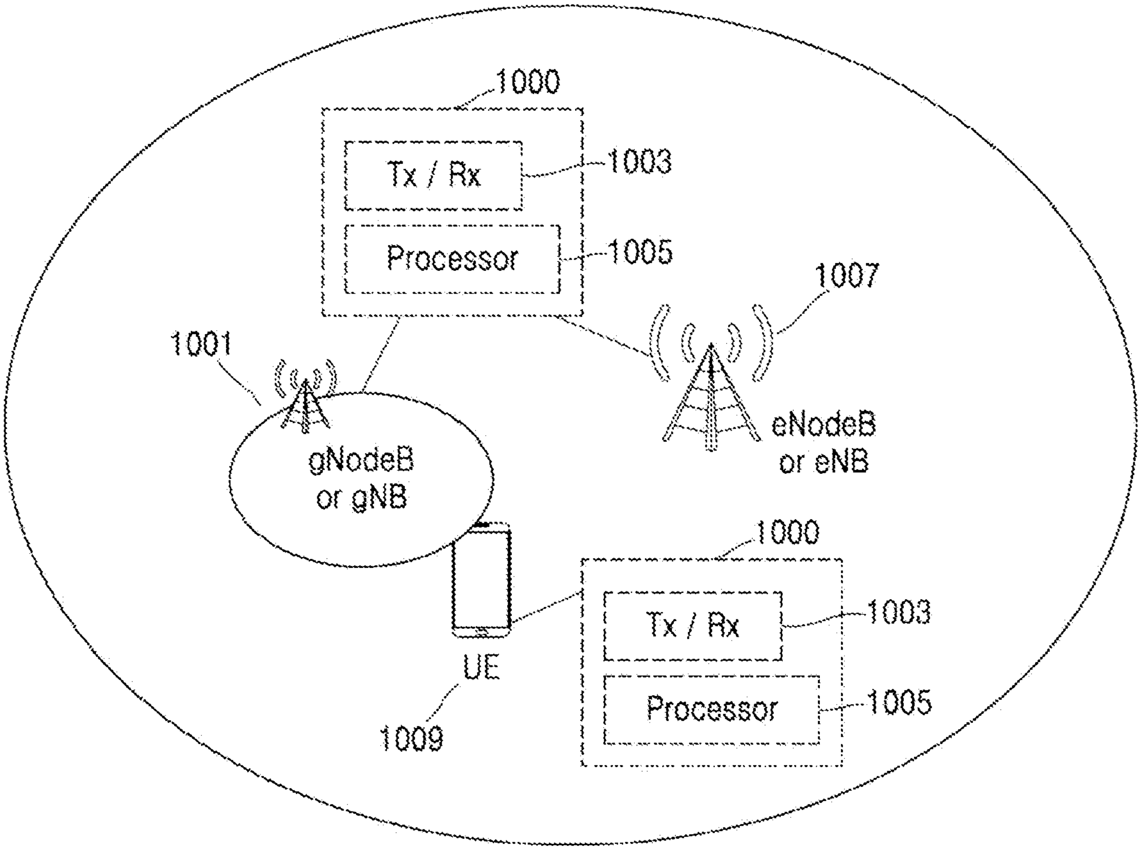
FIG. 10 illustrates an implementation of a wireless communication system implementing 3GPP and 5G technology implementing the methods as shown in the FIGS. 3-9 according to an embodiment of the present disclosure.

FIG. 10 an implementation of a wireless communication system implementing 3GPP and 5G technology. As shown in the figure gNode B 1001 and eNode B may co-exist with each other and can interact with the UE 1009. Further, the gNode B 1001 and eNode B may include transmitter/receiver 1003 configured to interact with the UE 1009. The the gNode B 1001 and eNode B may further include plurality of network nodes having one or more network elements. The one or more network element includes one or more processors 1005 coupled with a memory to implement the methods as shown in the FIGS. 3A-10. Thus, for the sake of the brevity the same has not been disclosed herein.

In an example, the processor 1005 may be a single processing unit or a number of units, all of which could include multiple computing units. The processor 203 may be implemented as one or more microprocessors, microcomputers, microcontrollers, digital signal processors, central processing units, state machines, logic circuitries, and/or any devices that manipulate signals based on operational instructions. Among other capabilities, the processor 1005 is configured to fetch and execute computer-readable instructions and data stored in the memory. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

As an example, a one or more network elements may be implemented with the one or more processors. As an example, the various network element may include, but not limited to, AF, AAnF, AUSF, UDM/SMF/PCF.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The transmitter/receiver 1003 may be a transmitter and a receiver unit. The transmitter/receiver 1003 may communicate with the user and/or other IoT devices via any of the wireless standards, such as 3G, 4G, 5G, or the like, other wireless techniques, such as Wi-FI, Bluetooth, etc. may also be used. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Figure 11:
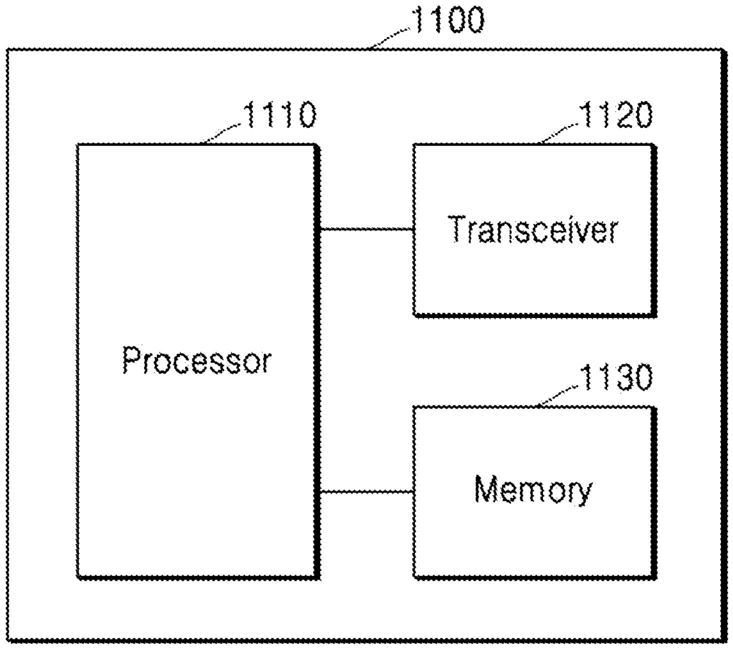
FIG. 11 illustrates a network entity according to embodiments of the present disclosure.

FIG. 11 illustrates a network entity according to embodiments of the present disclosure.

Referring to the FIG. 11, the network entity 1100 may include a processor 1110, a transceiver 1120 and a memory 1130. However, all of the illustrated components are not essential. The network entity 1100 may be implemented by more or less components than those illustrated in FIG. 11. In addition, the processor 1110 and the transceiver 1120 and the memory 1130 may be implemented as a single chip according to another embodiment.

The aforementioned components will now be described in detail.

The processor 1110 may include one or more processors or other processing devices that control the proposed function, process, and/or method. Operation of the network entity 1100 may be implemented by the processor 1110.

The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the network entity 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

Figure 12:
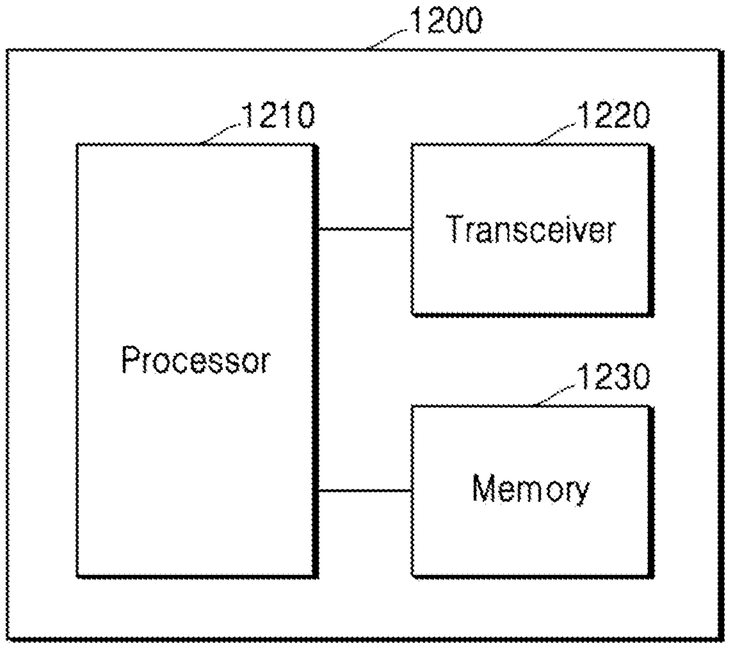
FIG. 12 illustrates a user equipment (UE) according to embodiments of the present disclosure.

FIG. 12 illustrates a user equipment (UE) according to embodiments of the present disclosure.

Referring to the FIG. 12, the UE 1200 may include a processor 1210, a transceiver 1220 and a memory 1230. However, all of the illustrated components are not essential. The UE 1200 may be implemented by more or less components than those illustrated in FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the UE 1200 may be implemented by the processor 1210.

The transceiver 1220 may include a RF transmitter for up-converting and amplifying a transmitted signal, and a RF receiver for down-converting a frequency of a received signal. However, according to another embodiment, the transceiver 1220 may be implemented by more or less components than those illustrated in components.

The transceiver 1220 may be connected to the processor 1210 and transmit and/or receive a signal. The signal may include control information and data. In addition, the transceiver 1220 may receive the signal through a wireless channel and output the signal to the processor 1210. The transceiver 1220 may transmit a signal output from the processor 1210 through the wireless channel.

The memory 1230 may store the control information or the data included in a signal obtained by the UE 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method performed by a user equipment (UE) in a wireless communication system, the method comprising:

obtaining a key related to an authentication server function (AUSF) entity;

generating a key related to authentication and key management for applications (AKMA) based on the key related to the AUSF entity and a subscription permanent identifier (SUPI) of the UE;

generating a key identifier corresponding to the key related to AKMA based on the key related to the AUSF entity;

generating an AKMA application key based on the key related to AKMA and an identifier of an AKMA application function (AF) entity, wherein the identifier of the AKMA AF entity is a concatenation of a fully qualified domain name (FQDN) of the AKMA AF entity and a Ua* security protocol identifier;

transmitting, to the AKMA AF entity, an application session establishment request message including the key identifier, wherein the key identifier includes routing information, and the routing information is used to identify an AKMA anchor function (AAnF) entity; and receiving, from the AKMA AF entity, an application session establishment response message as a response to the application session establishment request message.

2. The method of claim 1, wherein the key identifier, the key related to AKMA, and the SUPI of the UE are delivered to the AAnF entity.

3. A method performed by an authentication and key management for applications (AKMA) application function (AF) entity in a wireless communication system, the method comprising:

receiving, from a user equipment (UE), an application session establishment request message including a key identifier corresponding to a key related to AKMA, wherein the key related to AKMA is generated based on a key related to an authentication server function (AUSF) entity and a subscription permanent identifier (SUPI) of the UE and the key identifier is generated based on the key related to the AUSF entity;

identifying an AKMA anchor function (AAnF) entity based on routing information included in the key identifier;

transmitting. to the AAnF entity, a key request message including the key identifier and an identifier of the AKMA AF entity, wherein the identifier of the AKMA AF entity is a concatenation of a fully qualified domain name (FQDN) of the AKMA AF entity and a Ua* security protocol identifier;

receiving, from the AAnF entity, a key response message including an AKMA application key as a response to the key request message, wherein the AKMA application key is generated based on the key related to AKMA and the identifier of the AKMA AF entity; and transmitting, to the UE, an application session establishment response message as a response to the application session establishment request message.

4. The method of claim 3, wherein the key identifier, the key related to AKMA, and the SUPI of the UE are delivered to the AAnF entity.

5. A user equipment (UE) in a wireless communication system, the UE comprising:

a transceiver; and at least one processor coupled to the transceiver and configured to:

obtain a key related to an authentication server function (AUSF) entity;

generate a key related to authentication and key management for applications (AKMA) based on the key related to the AUSF entity and a subscription permanent identifier (SUPI) of the UE;

generate a key identifier corresponding to the key related to AKMA based on the key related to the AUSF entity;

generate an AKMA application key based on the key related to AKMA and an identifier of an AKMA application function (AF) entity, wherein the identifier of the AKMA AF entity is a concatenation of a fully qualified domain name (FQDN) of the AKMA AF entity and a Ua* security protocol identifier;

transmit, to the AKMA AF entity, an application session establishment request message including the key identifier, wherein the key identifier includes routing information, and the routing information is used to identify an AKMA anchor function (AAnF) entity; and receive, from the AKMA AF entity, an application session establishment response message as a response to the application session establishment request message.

6. The UE of claim 5, wherein the key identifier, the key related to AKMA, and the SUPI of the UE are delivered to the AAnF entity.

* * * * *